US008139266B2

(12) United States Patent
Iida

(10) Patent No.: US 8,139,266 B2
(45) Date of Patent: Mar. 20, 2012

(54) COLOR PRINTING CONTROL DEVICE, COLOR PRINTING CONTROL METHOD, AND COMPUTER READABLE RECORDING MEDIUM STORED WITH COLOR PRINTING CONTROL PROGRAM

(75) Inventor: Masaru Iida, Kawasaki (JP)

(73) Assignee: Konica Minolta Business Technologies, Inc., Chiyoda-ku, Tokyo (JP)

( * ) Notice: Subject to any disclaimer, the term of this patent is extended or adjusted under 35 U.S.C. 154(b) by 766 days.

(21) Appl. No.: 12/196,892

(22) Filed: Aug. 22, 2008

(65) Prior Publication Data

US 2009/0073467 A1 Mar. 19, 2009

(30) Foreign Application Priority Data

Sep. 14, 2007 (JP) ................................ 2007-239944
Apr. 30, 2008 (JP) ................................ 2008-119154

(51) Int. Cl.
*G06F 15/00* (2006.01)
*G06K 9/00* (2006.01)

(52) U.S. Cl. .......... 358/1.9; 358/2.1; 358/3.01; 358/1.1; 358/1.13; 358/1.18; 358/500; 358/501; 358/504; 358/512; 358/515; 358/518; 358/519; 358/521; 358/525; 358/534; 358/302; 358/448; 382/162; 382/163; 382/164; 382/165; 382/166; 382/167; 382/232; 382/254; 382/229; 382/112; 347/43; 347/15; 347/24; 347/100; 347/115; 347/172; 347/173; 347/175; 347/176; 347/177; 347/178; 399/27; 399/28; 399/39; 399/45; 399/54; 399/55; 399/59; 399/60; 399/62; 399/178; 399/184; 399/237; 345/589; 345/590; 345/591; 345/593; 345/596

(58) Field of Classification Search .................. None
See application file for complete search history.

(56) References Cited

U.S. PATENT DOCUMENTS

| 4,656,505 | A  | * | 4/1987  | Yamada et al. .............. 358/521 |
| 7,212,314 | B2 | * | 5/2007  | Borchers et al. .............. 358/2.1 |
| 7,474,446 | B2 | * | 1/2009  | Horiuchi et al. .............. 358/520 |
| 7,636,473 | B2 | * | 12/2009 | Imai et al. .................... 382/167 |
| 2004/0036897 | A1 | * | 2/2004 | Yamauchi ..................... 358/1.9 |
| 2005/0063749 | A1 |   | 3/2005 | Harris et al. |

FOREIGN PATENT DOCUMENTS

| JP | 01-259951 | 10/1989 |
| JP | 08-163387 | 6/1996 |
| JP | 2001-313841 | 11/2001 |
| JP | 2004-157190 | 6/2004 |
| JP | 2004-243559 | 9/2004 |
| JP | 2005-512199 A | 4/2005 |
| JP | 2007-235661 | 9/2007 |

OTHER PUBLICATIONS

Notification of Reason for Refusal in JP 2008-119154 dated Aug. 11, 2009, and an English Translation thereof.

* cited by examiner

*Primary Examiner* — Steven Kau
(74) *Attorney, Agent, or Firm* — Buchanan Ingersoll & Rooney PC

(57) ABSTRACT

The color printing control device outputs color material reduction processed data generated by applying a color material reduction process to each pixel of bitmaps converted to color material colors to be used in printing, when it is judged that the color material reduction printing mode is specified. The color material reduction process includes chroma conversion that reduces chroma and under-color removal/black generation that replaces at least a portion of achromatic components generated by overlaying of a plurality of color materials.

29 Claims, 32 Drawing Sheets

FIG.2

```
/* Chroma conversion */
void ModSaturation( unsigned char *C, unsigned char *M,
                    unsigned char *Y, unsigned char *K,
                    double Ratio ) /* Ratio == Chroma conversion ratio */
{
    unsigned char GL;
    GL = (*C * 5 + *M * 9 + *Y * 2) / 16;
    *C = GL + ( *C - GL ) * Raito;
    *M = GL + ( *M - GL ) * Raito;
    *Y = GL + ( *Y - GL ) * Raito;
    }
    return;
}
```

FIG.3
(a) Input CMYK
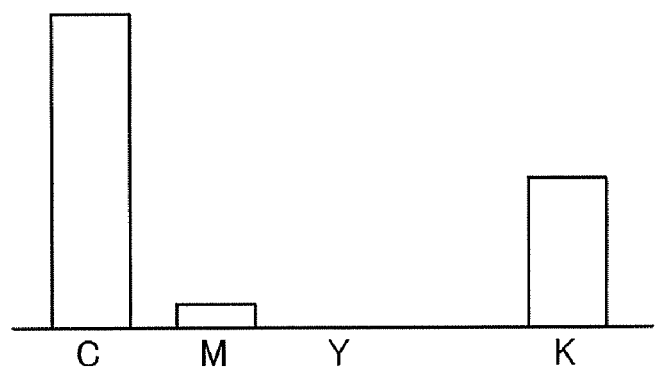
(b) Chroma conversion
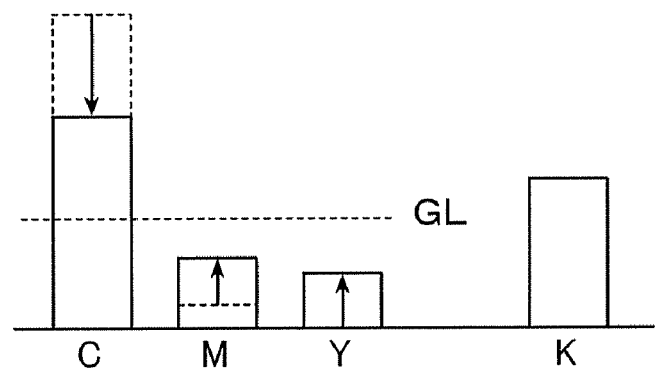
(c) Conversion result
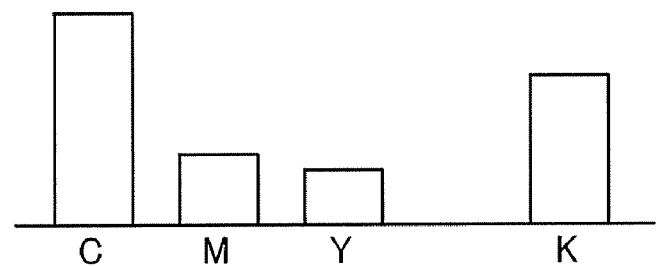

FIG.4

```
/* Density conversion */
void ModDensity( unsigned char *C, unsigned char *M,
                 unsigned char *Y, unsigned char *K,
                 double Ratio )  /* Ratio == Density conversion ratio */
{
    *C = *C * Raito;
    *M = *M * Raito;
    *Y = *Y * Raito;
    return;
}
```

FIG.5

```
signed short Min(signed short X, signed short Y) {
    if (X < Y) return X; else return Y;
}
/* Under-color removal / black generation*/
void UcrBg( unsigned char *C, unsigned char *M,
            unsigned char *Y, unsigned char *K,
            double Ratio ) /* Ratio == Under-color removal ratio */
{
    unsigned short BL;
    BL = Min(*C, Min(*M,*Y)) * Ratio;
    *C = *C - BL;
    *M = *M - BL;
    *Y = *Y - BL;
    *K = Min(255, *K + BL);
    return;
}
```

FIG.15

```
/* Grayscale density calculation */
GL = (Cin * 5 + Min * 9 + Y * 2) / 16;

/* Chroma calculation */
S = (( MaxValue(Cin, MaxValue(Min, Yin)) - MinValue(Cin, MinValue(Min, Yin)) )
    * ( 256 - Kin MinValue(Cin, MinValue(Min, Yin)) ) ) / 256;

/* Chroma conversion */
Cout = GL + (( Cin - GL ) * Rs) / 128;
Mout = GL + (( Min - GL ) * Rs) / 128;
Yout = GL + (( Yin - GL ) * Rs) / 128;
Kout = Kin;
```

FIG.17

```
/* Minimum density value acquisition */
D = MinValue(Cin, MinValue(Min,Yin));

/* Black generation */
Kout = Kin + B;

/* Under-color removal */
Cout = Cin - U;
Mout = Min - U;
Yout = Yin - U;
```

FIG.19

```
/* Maximum density value acquisition */
M = MaxValue(MaxValue(Cin, Min) , MaxValue(Yin,Kin));

/* Density conversion */
Cout = (Cin * Rd) / 128;
Mout = (Min * Rd) / 128;
Yout = (Yin * Rd) / 128;
Kout = (Kin * Rd) / 128;
```

FIG.20
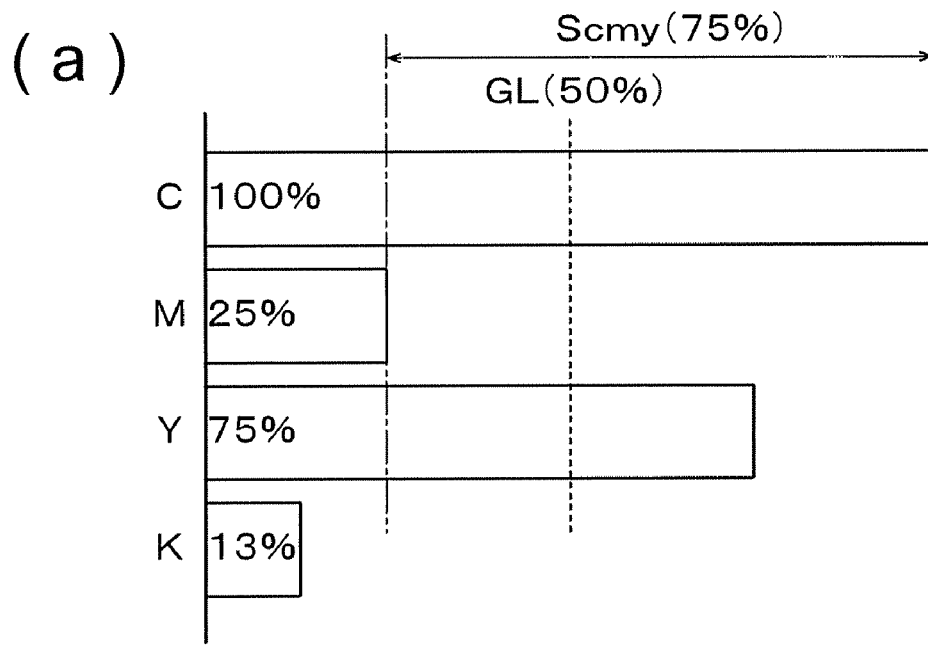
(a)
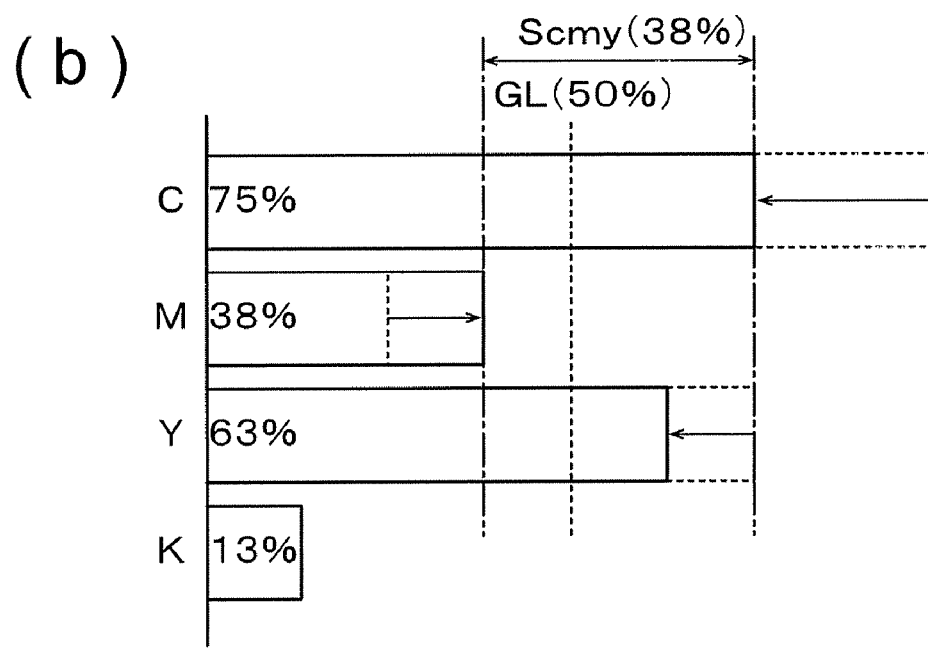
(b)

FIG.21
(a)
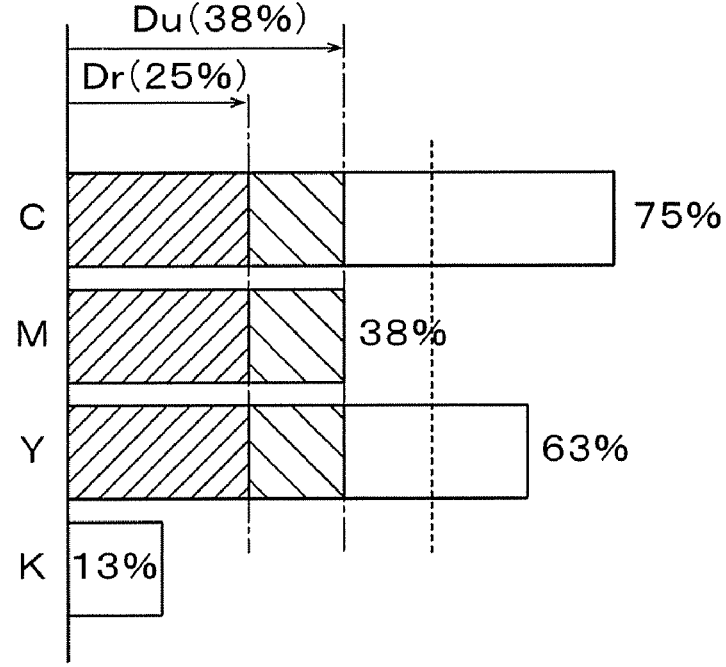
(b)
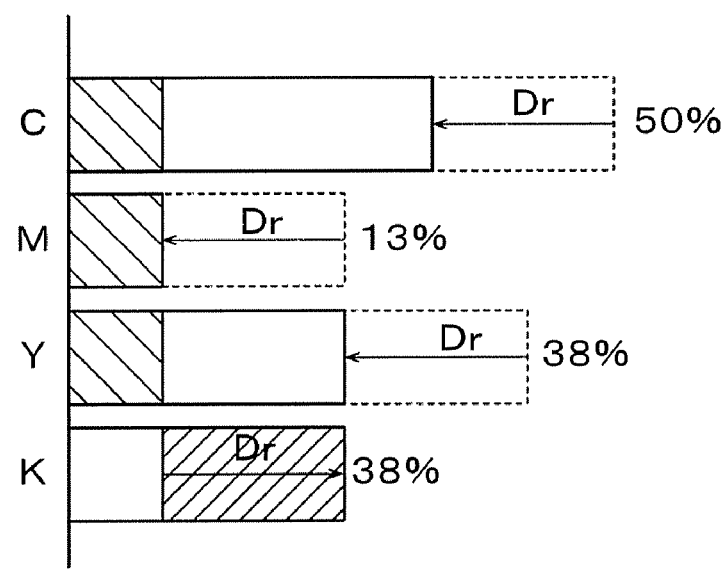

COLOR PRINTING CONTROL DEVICE, COLOR PRINTING CONTROL METHOD, AND COMPUTER READABLE RECORDING MEDIUM STORED WITH COLOR PRINTING CONTROL PROGRAM

CROSS-REFERENCE TO RELATED APPLICATION

This application is based on Japanese Patent Application No. 2007-239944 filed on Sep. 14, 2007 and No. 2008-119154 filed on Apr. 30, 2008, the contents of which are incorporated herein by reference.

BACKGROUND

1. Technical Field

The invention relates to a color printing control device, a color printing control method, and a computer readable recording medium stored with a color printing control program.

The invention is related to a color printing device, a color printing control method, and a computer readable recording medium stored with a color printing control program each having a mode for executing a printing process by saving color materials, 2. Description of Related Art Most color printing devices accomplish full-color printing by overlaying images each produced in one of the four color materials, i.e., cyan (C), magenta (M), yellow (Y), and black (K) on a printing medium. As such, the cost of color printing tends to be more expensive than monochromatic (grayscale) printing, which is printed with black (K) color material alone, as it consumes more color materials.

For example, when the test chart defined in ISO/IEC 24712:2006 "Color test pages for measurement of office equipment consumable yield" is printed with a full-color laser beam printer, it consumes twice as much color materials (toners in this case) compared to a case of printing the same test chart in grayscale. Also, when a color patch (RGB 216-color patch) expressed as a combination of 0%, 20%, 40%, 60%, 80% or 100% of each one of three colors, i.e., red (R), green (G) and blue (B) is printed in color, it consumes approximately three times as much color materials compared to a case of printing the same color patch in grayscale.

Incidentally, it is preferable that printing cost is kept as low as possible when the purpose of printing is to proof the manuscript or to check its layout For such needs available are color printing devices having printing modes that save printing cost by suppressing the consumption of color materials. As the means of realizing the printing modes for suppressing the color material consumptions, methods of printing color pictures are used such as (1) converting colors into grayscale; (2) reducing the color image density of each color material; (3) with a reduced total number of pixels by skipping pixels of each color material, etc.

However, in the method (1) of printing by converting color images into grayscale, color information is discarded in the conversion so that it is difficult to check the enhancement effect of characters expressed, for example, in red in order to stand out in the original manuscript, because they become weaker in density than unstressed characters in black as they are converted. Also, yellow is essentially a color with a high luminosity, so that it becomes very weak when it is converted into grayscale, and becomes unidentifiable from the printing ground (white). In the method (2) of printing with a reduced color image density for each color material, it is necessary to reduce the image color density to approximately 50% in order to print the abovementioned RGB 216 color patch with the same amount of color material consumption equivalent to that of grayscale printing. However, since gradation reproduction is achieved with dither screens in most color printing devices, reduction of density means constituting printing images with smaller dither dots, which worsens especially the legibility of small font characters. The method (3) of skipping pixels of each color material causes printed images to blur, again worsening the legibility of small font characters. Moreover, any attempt of maintaining or improving legibility using these methods results in spoiling the effort of reducing color material consumption.

On the other hand, technology is proposed for saving color materials consumed in printing by modifying the chroma or luminosity of pixels so as to specify a gray pixel to be printed by a combination of color inks and to print the particular pixel with a black ink alone. See Unexamined Japanese Patent Publication No. 2005-512199.

However, the technology described in the abovementioned patent document is a color material reduction process to reduce color materials by intervening with printing data on a host computer or a communication route between a host computer and a color printing device. Incidentally, PostScript® is capable of describing an object defined in various color spaces with a single set of printing data. Therefore, the color material reduction process in the technology described in patent document 1 has to be able to handle various printing data formats and color space definitions of various PDL (Page Description Languages), which creates a problem that it requires a large amount of date resources to be able to respond individually. Moreover, a color printing device has also been proposed recently, which is equipped with an interface so as to be able to print by reading data stored in a memory device (memory direct printing function). A problem of the technology described in the abovementioned patent document is that it cannot handle printing that completes within a color printing device without dealing with a host computer.

SUMMARY

To solve at least one of the abovementioned issues, a color printing control device reflecting one aspect of the present invention is provided. The color printing control device controls printing of a color image by overlaying achromatic color material including at least black with a plurality of chromatic color materials on a printing medium. The color printing control device comprises a judgment part that judges whether or not a color material reduction printing mode is specified for printing with reduced consumption of color materials; and an output part that outputs color material reduction processed data generated by applying a color material reduction process to each pixel of bitmaps converted to color material colors to be used in printing, when it is judged by said judgment part that the color material reduction printing mode is specified, wherein said color material reduction process includes chroma conversion that reduces chroma and under-color removal/black generation that replaces at least a portion of achromatic components generated by overlaying of a plurality of color materials.

In said chroma conversion, it is preferable that a chroma conversion ratio, which represents a ratio of chroma after the conversion relative to chroma before the conversion, is set up for each pixel in accordance with the chroma of the pixel being processed.

In said chroma conversion, it is preferable that the chroma conversion ratio of a first pixel is greater than the chroma conversion ratio of a second pixel, which has lower chroma than that of the first pixel.

In said chroma conversion, it is preferable that choromatic components consisting of chromatic color components alone are converted by converting densities of chromatic color material components of each pixel.

It is preferable that said color material reduction process further contains density conversion that reduces density.

In said density conversion, it is preferable that a density conversion ratio, which represents a ratio of density after the conversion relative to density before the conversion, is set up for each pixel in accordance with the density of the pixel being processed.

In said density conversion, it is preferable that the density conversion ratio of a first pixel is greater than the density conversion ratio of a second pixel, which has lower density than that of the first pixel In said color material reduction process, it is preferable that said under-color removal/black generation is performed after said chroma conversion.

It is preferable that said color material reduction process has a first process and a second process, which is different in the process content from the first process, and depending on the attribute of a pixel to which said color material reduction process is applied, the color material reduction process applied to the particular pixel is switched either to said first process or said second process.

It is preferable that said attribute contains the type of print object to which the particular pixel belongs and the type of said print object can be classified at least into image objects and non-image objects.

It is preferable that the parameters of processes executed in said first process and said second process are set up in such a way that the color material reduction amount for pixels of said image objects is greater than the color material reduction amount for pixels of said non-image objects.

It is preferable that the parameters of the process executed in said color material reduction process are set up based on the user's instruction at an operating unit of the color printing control device.

It is preferable that the parameters of the process executed in said color material reduction process are set up based on instructions contained in printing data inputted into the color printing control device.

In said under-color removal/black generation, all of the achromatic components that are generated during the course of overlaying of a plurality color materials are replaced with achromatic color materials.

To solve at least one of the abovementioned issues, a color printing control device reflecting one aspect of the present invention is provided. The color printing control device controls printing of a color image by overlaying achromatic color material including at least black with a plurality of chromatic color materials on a printing medium. The color printing control device comprises a judgment part that judges whether or not a color material reduction printing mode is specified for printing with reduced consumption of color materials; and a color conversion part that executes color conversion for converting color data inputted into the color printing control device into colors of color materials to be used in printing using color conversion profile for color material reduction acquired by simultaneously executing a color material reduction process, when it is judged by said judgment part that the color material reduction printing mode is specified; wherein said color material reduction process includes chroma conversion that reduces chroma and under-color removal/black generation that replaces at least a portion of achromatic components generated by overlaying of a plurality of color materials.

It is preferable that said color conversion profile for color material reduction has a first profile and a second profile, which is different in the color material reduction process content from the first profile, and depending on the attribute of a pixel to which said color conversion is applied, the color conversion profile for color material reduction to be used in the color conversion applied to the particular pixel is switched either to said first process or said second process.

It is preferable that said attribute contains the type of print object to which the particular pixel belongs and the type of said print object can be classified at least to image objects and non-image objects.

It is preferable that the color conversion parameters of said first profile and said second profile are set up in such a way that the color material reduction amount for pixels of said image objects is greater than the color material reduction amount for pixels of said non-image objects.

In said under-color removal/black generation, it is preferable that all of the achromatic components that are generated during the course of overlaying of a plurality color materials are replaced with achromatic color materials.

The objects, features, and characteristics of this invention other than those set forth above will become apparent from the description given herein below with reference to preferred embodiments illustrated in the accompanying drawings.

BRIEF DESCRIPTION OF THE DRAWINGS

FIG. 2 is a diagram showing an algorithm for chroma conversion.

FIG. 3 is a diagram for describing the chroma conversion.

FIG. 4 is a diagram showing an algorithm for density conversion.

FIG. 5 is a diagram showing an algorithm for under-color removal/black generation (UCR/BG).

FIG. 8 is a flow chart showing the process procedure on the color printing device 1a.

FIG. 15 is a diagram showing an algorithm for chroma conversion.

FIG. 17 is a diagram showing an algorithm for under-color removal/black generation.

FIG. 19 is a diagram showing an algorithm for density conversion.

FIG. 20 shows a diagram of an example of CMYK density of an input pixel and a diagram of the result of a chroma conversion.

FIG. 21 shows a diagram for describing under-color components and under-color removal amounts, and a diagram of the result of an under-color removal/black generation

DETAILED DESCRIPTION

The preferred embodiments of the invention will be described in detail below with reference to the accompanying drawings.

Figure 1:
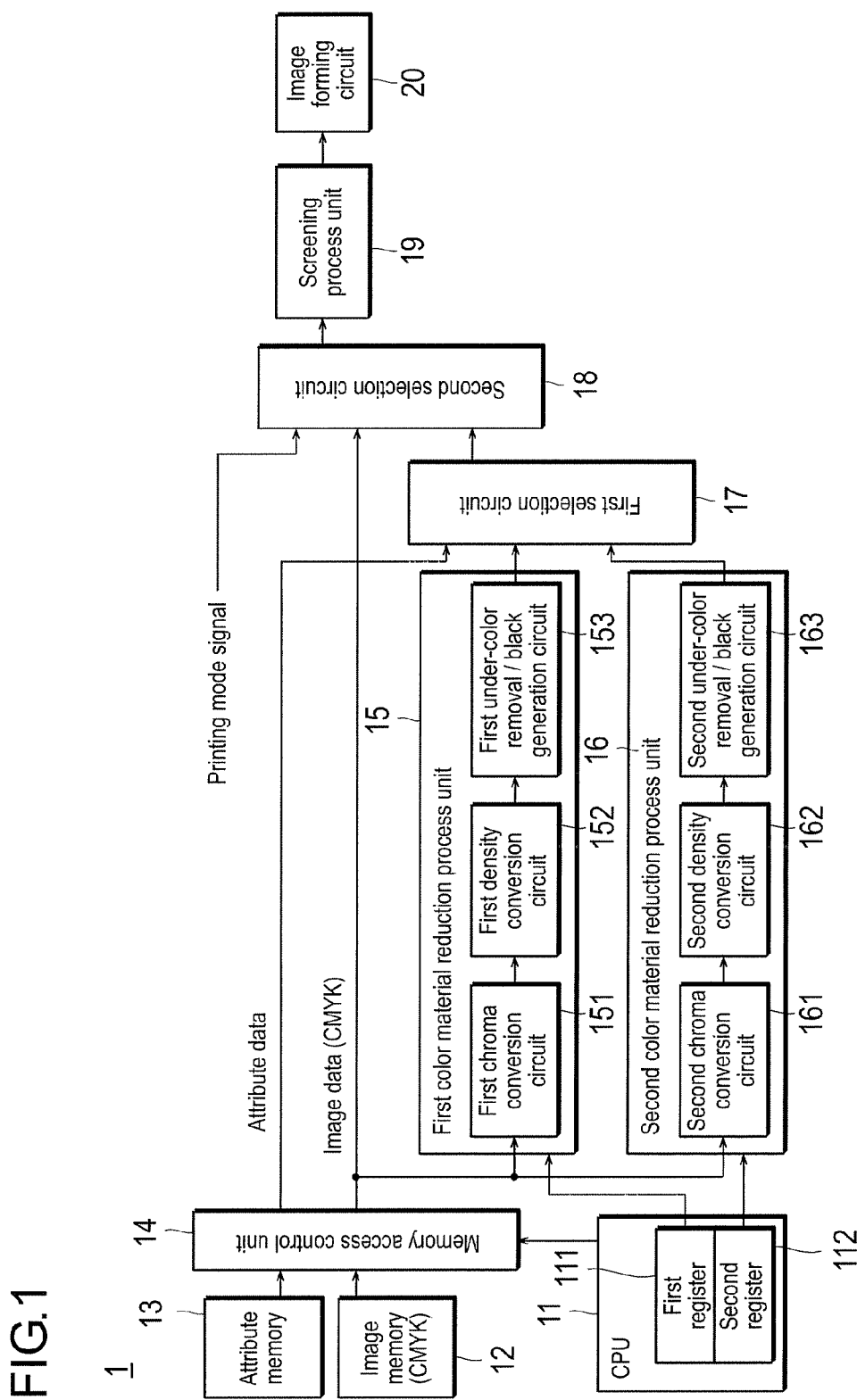
FIG. 1 is a block diagram showing the constitution of a color printing device 1 using a color printing control device according to a first embodiment of the present invention.

FIG. 1 is a block diagram showing the constitution of a color printing device 1 using a color printing control device according to a first embodiment of the present invention.

The color printing device 1 shown in FIG. 1 is a color printing device that prints a color image by overlaying achromatic color material including at least black with a plurality of chromatic color materials on a printing medium, more specifically an electronic type color printer using four color toners of cyan (C), magenta (M), yellow (Y) and black (K).

The color printing device 1 is equipped with a CPU 11 that controls various parts and executes various arithmetic processes in the color printing device 1; an image memory 12 that stores (printing) image data obtained by analyzing the entered printing data; an attribute memory 13 that stores attribute data of objects to which pixels of image data developed in the image memory belong; a memory access control unit 14 that sequentially causes the image data and attributes data to be sent out from the image memory 12 and the attribute memory 13 respectively; a first color material reduction process unit 15 and a second color material reduction process unit 16 that reduce the color material consumption amount; a first selection circuit 17 that selects either the output data of the first color material reduction process unit 15 or the output data of the second color material reduction process unit 16 in accordance with the attribute data; a second selection circuit 18 either the image data (pixel data) read out from the image memory or the output data of the first selection circuit 17 in accordance with the printing mode signal; a screening process unit 19 that generates image data with which image can be formed using a gradation reproduction method such as a dither method; and an image forming circuit 20 that performs printing control based on the image data received.

The first color material reduction process unit 15 and the second color material reduction process unit 16 are functional blocks that independently convert CMYK densities of image data.

The first color material reduction process unit 15 includes a first chroma conversion circuit 151, a first density conversion circuit 152, and a first under color removal/black generation circuit 153, while the second color material reduction process unit 16 includes a second chroma conversion circuit 161, a second density conversion circuit 162, and a second under color removal/black generation circuit 163. The first chroma conversion circuit 151 and the second chroma conversion circuit 161 are the circuits for reducing chroma, the first density conversion circuit 152 and the second density conversion circuit 162 are the circuits for reducing densities, and the first under-color removal/black generation circuit 153 and the second under-color removal/black generation circuit 163 are for replacing at least a portion of the achromatic components generated by overlaying a plurality of color materials with achromatic color material.

The conversion characteristics of each circuit contained in the first color material reduction process unit 15 and the second color material reduction process unit 16 are determined by the (conversion) parameters stored in a first register 111 and a second register 112. The particular parameters are set up in the first register 111 and the second register 112 by the CPU 11. Therefore, the first color material reduction process unit 15 and the second color material reduction process unit 16 are different to each other in the process contents depending on the differences in the parameters.

In the present embodiment, set up as the parameters are: the chroma conversion ratio that indicates the ratio of chroma after the conversion relative to the chroma before the conversion in the first chroma conversion circuit 151 and the second chroma conversion circuit 161; the density conversion ratio that indicates the ratio of density after the conversion relative to the density before the conversion in the first density conversion circuit 152 and the second density conversion circuit 162; and the under-color removal ratio that indicates the ratio of acromatic components generated by the overlaying of a plurality of color material to be replaced by achromatic color material in the first under-color removal/black generation circuit 153 and the second under-color removal/black generation circuit 163.

The image forming circuit 20 controls printing of images based on the image data received on recording media such as paper using, for example, a publicly known electronic imaging process.

FIG. 1 shows those of the constituents of the color printing device 1 that are mainly related to the present invention, while the color printing device 1 may contain constituents other than those constituents described above, or may not contain a certain portion of the constituents described above.

The color printing device 1 constituted in such a way has a color material reduction printing mode and operates as follows. The term "color materials" used in this invention is used to mean a notion that includes toners, inks, etc. In other words, the present invention is applicable not only to the imaging method of electronic photography but also to other imaging methods such as the ink jet method in which the consumption amount of color materials varies with images.

First, the color printing device 1 receives printing data from an upper level device (host computer) such as a PC (personal computer).

The CPU 11 analyzes the printing data received at a data receiving circuit via a printer interface (not shown), and develops the image data of 32 bit (8 bit*4 colors) data color converted into CMYK, which are the color material color to be used in the color printing device 1, into the image memory 12 in accordance with the particular printing data. The CPU 11 also sets up the attribute data that shows the attributes of each pixel of the image data developed into the image memory 12 into the attribute memory 13. The attributes contain the types of print objects to which the particular pixel belongs and the types of the print objects are classified at least into image objects and non-image objects. In the present embodiment, attribute values are set up as the attribute data for identifying whether the object attributes are either image objects or non-image objects.

The memory access control unit 14 controls in such a way as to cause the image data and the attribute data to be sent out from the image memory 12 and the attribute memory 13 respectively in accordance with an instruction from the CPU 11.

Each circuit contained in the first color material reduction process unit 15 and the second color material reduction process unit 16 executes conversion on the received image data in accordance with the parameters set up.

Next, the operations at the first chroma conversion circuit 151 and the second chroma conversion circuit 161 will be described with reference to FIG. 2 and FIG. 3. FIG. 2 is a diagram showing an algorithm of chroma conversion, and FIG. 3 is a diagram for describing the chroma conversion. In FIG. 3, a length in the vertical direction of the bar graph shows the density of each color component.

The chromatic color components C, M, and Y constitute the chroma components of the printed color. In the present invention, the chroma conversion is executed by converting the densities of C, M, and Y while maintaining the K component.

As an example, we will describe about a pixel having the densities of C, M, Y and K as shown in FIG. 3(*a*).

First, the grayscale density GL is calculated when only the CMY components are converted into grayscale as shown in FIG. 3(*b*). Considering CMY as the complimentary colors of RGB, the CMY grayscale density conversion formula (GL= (C*5+M*9+Y*2)/16) is deducted from the known RGB grayscale conversion formula (NTSC; Y=0.299R+0.587G+ 0.114B). All the coefficients are approximated as n/16. By approximating the coefficients to n/16, divisions can be achieved by bit-shifting so that the circuit can be realized with a simpler hardware constitution.

Next, as shown in FIG. 3(*b*) and FIG. 3(*c*), the difference between the density of each one of the C, M and Y colors and the grayscale density GL is modified in accordance with the chroma conversion ratio (shown as "Ratio" in FIG. 2). When the density of each one of C, M and Y colors is the same amount of density GL, it produces gray color of density GL.

As the density difference between the gray scale density GL and each color is a component that constitutes the chroma, it is considered that the smaller the density between the gray scale density GL and each color, the lower the chroma is. By giving the chroma conversion ratio in the format of n/16, the circuit can be realized with a simpler hardware constitution.

Next, the operations at the first chroma conversion circuit 152 and the second chroma conversion circuit 162 will be described with reference to FIG. 4. FIG. 4 is a diagram showing an algorithm for density conversion.

As shown in FIG. 4, the density conversion is executed by multiplying the density of each one of C, M, K and Y colors before the conversion by the density conversion ratio (shown as "Ratio" in FIG. 4).

Figure 6:
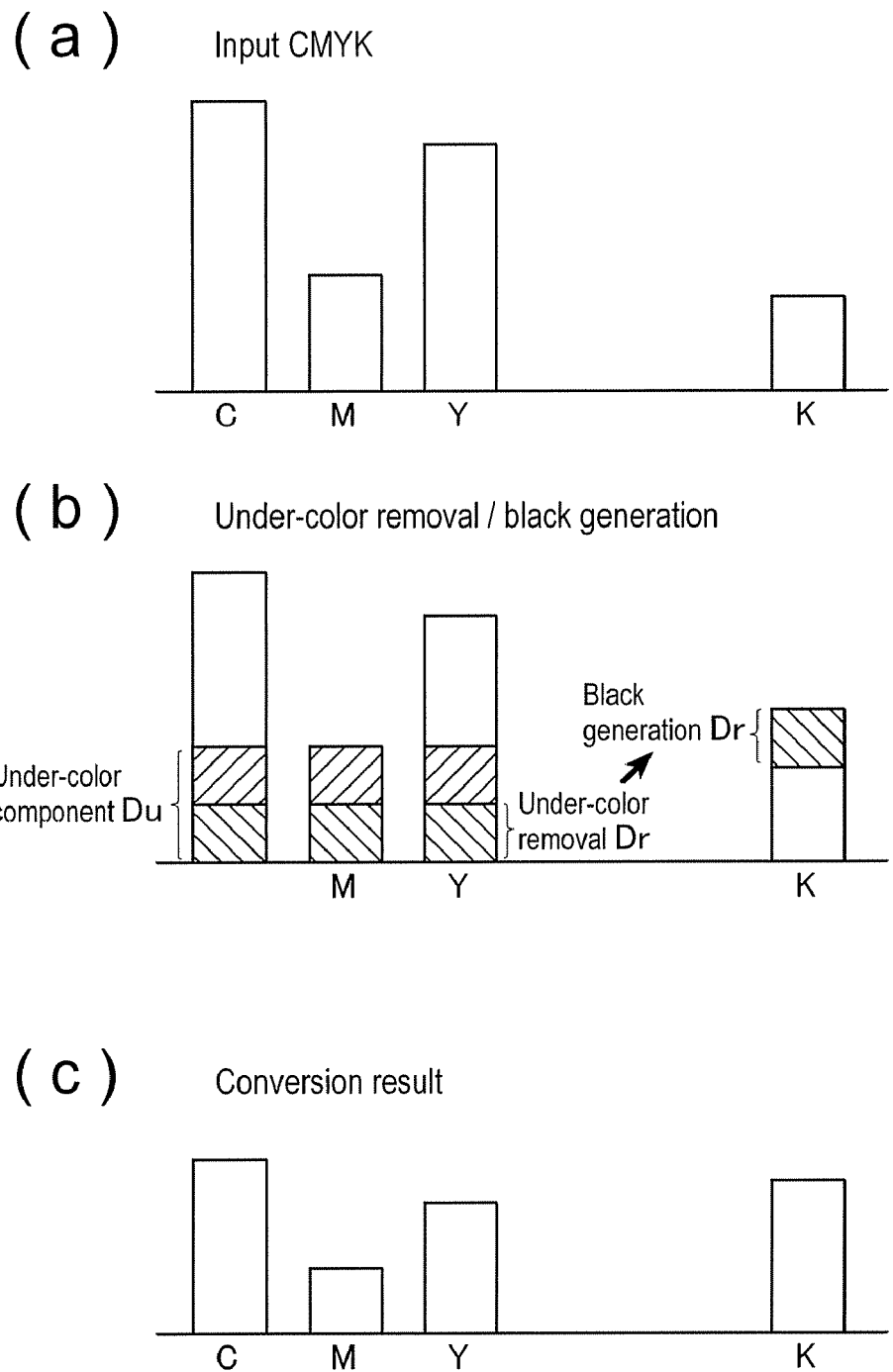
FIG. 6 is a diagram for describing the under-color removal/black generation.

Next, the operations at the first under-color removal/black generation circuit 153 and the second under-color removal/ black generation circuit 163 will be described with reference to FIG. 5 and FIG. 6. FIG. 5 is a diagram showing an algorithm for under-color removal/black generation (UCR/BG), and FIG. 6 is a diagram for describing the under-color removal/black generation. In FIG. 6, a length in the vertical direction of the bar graph shows the density of each color component.

As an example, we will describe about a pixel having the densities of C, M, Y and K as shown in FIG. 6(*a*). If the densities of C, M, and Y colors are all equal to the density D, it can be regarded to be equivalent to a gray color of the density D.

In the under-color removal/black generation, a portion or all of a color with the lowest density value among C, M and Y is converted into the K print (black) as the under-color component Du as shown in FIG. 6(*b*) based on the concept described above. When a portion of the under-color component, Dr, is converted into the K print (black), the density of each one of C, M, and Y colors is reduced by Dr and the K density is increased by Dr. This results in a reduction of color materials of 3Dr−Dr=2Dr. The ratio of the amount of the under-color component Du to be converted into the K print (black), i.e., Dr/Du, is the under-color removal ratio.

If one of the CMY densities is zero, there is no under-color component so that it is impossible to realize the reduction of color materials to be used by under-color removal/black generation. However, it is possible to reduce the color materials to be used by under-color removal/black generation as the under-color component can be generated by implementing the chroma conversion that reduces chroma in the previous step even if the density of either one of the original CMY colors is zero.

In the present embodiment, the first selection circuit 17 selects to output the output data of the first color material reduction process unit 15, when the attribute data of a pixel shows that it is an image object, and selects to output the output data of the second color material reduction process unit 16, when the attribute data of a pixel shows that it is a non-image object.

The printing mode signal is a signal that specifies whether the present printing mode is the normal printing mode or the color material reduction printing mode. The printing mode signal is set up either by the user's instruction through the menu or switches on the operating panel (not shown) of the color printing device 1, or by the mode instruction order contained in the printing data from the host computer (not shown).

The second selection circuit 18 selects to output the output data of the first selection circuit 17, when the printing mode signal shows that it is a color material reduction mode, and selects to output the image data (pixel data) (to which no conversion is applied for a color material reduction) that is read from the image memory, when the printing mode signal shows that it is a normal printing mode.

As is well known, the color material consumption in color printing is increased because of overlaying images of more than two colors. Also well-known is that a reduction of color material consumption by means of under-color/black generation has been practiced in some color printing jobs by replacing the achromatic color (gray) components that develops as a result of overlaying three color materials, C, M and Y, with an achromatic color (black). However, as described before, the effect of the reduction of color material consumption cannot be obtained by means of under-color removal/black generation alone in case of a sharp (high chroma) color, which does not contain achromatic (gray) component. This embodiment is to achieve an effect of color material consumption reduction by means of under-color removal/black generation by forcibly causing achromatic (gray) components to be generated in the under-color by reducing chroma, even in case of a "sharp (high chroma) color, which does not contain achromatic (gray) component in the under-color" under a premise that, except for color proofing jobs, it is not necessarily required to reproduce accurate colors in printing purposes, such as draft printing, where high picture quality is not necessarily required. The density conversion for reducing density is a secondary means to achieve a further reduction of color material consumption, and is not an essential means.

In this embodiment, it is possible to reduce the amount of color materials to be consumed in printing by implementing conversion processes of "chromatic reduction," "density reduction (luminosity improvement)," and "under-color removal/black generation" in the first color material reduction process unit 15 and the second color material reduction process unit 16 when the color material reduction printing mode is specified. In case of a full-color printing without the color material reduction printing mode, it is known that the consumption of color materials is especially high in image objects of photographs and the like which include a lot of objects of halftone, while the consumption of color materials is less for non-image objects where monochromatic expression is prevalent compared to image objects. Therefore, the color material consumption can be reduced without sacrificing the legibility of characters too much by maintaining the color material reduction ratio especially high for image objects during the color material reduction printing mode and setting up the color material reduction ratio at a proper lever for non-image objects.

Since the conversion process in the present embodiment is implemented using the result of the conversion as the color materials (CMYK) to be used on the color printing device 1, the color space to be the target of the conversion can be unilaterally defined even when the PDL (page description language) is used, in which the print color is specified in various color spaces such as Postscript®. Therefore, it does not require too many data resources.

In a full-color printing such as a photograph where the majority of objects are image objects, approximately 2.5-3 times of toners are used compared to the case of gray scale printing. On the other hand, in a full-color printing of primarily characters, approximately 1-2 times of toners are used compared to the case of gray scale printing. Therefore, it is preferable to set up the conversion parameters in such a way that would reduce the color material consumption to approximately ⅓ (of the amount otherwise consumed) in the color material reduction process for image objects (the first color material reduction process unit 15), and would reduce the color material consumption to approximately ½ in the color material consumption for non-image objects (the second color material reduction process unit 16). In arranging such a way, the same amount of color material consumption can be achieved as in the case of grayscale printing. This has an effect of being able to promote color printing to the user without being concerned with printing costs too much.

According to an experiment, the color material consumption reduces to approximately ⅓ at the chroma conversion ratio of 50%, the density conversion ratio of 62.5%, and the under-color removal ratio of 100%, and the color material consumption reduces to approximately ½ at the chroma conversion ratio of 50%, the density conversion ratio of 75.0%, and the under-color removal ratio of 100%. Since the color component is not totally abandoned as the chroma conversion ratio of 50% is maintained, the effect of an enhancement component such as colored characters is still achievable. Moreover, the lowering of the character legibility can be suppressed as well, since the density conversion ratio of 70% is still maintained for character objects that correspond to the non-image object.

Also in the present embodiment, the parameters to be set up in the first color material reduction process unit 15 and the second color material reduction process unit 16 are set up in the first register 111 and the second register 112 respectively which can be directly accessed from the CPU 11. Therefore, it is possible to change the parameters within the control program arbitrarily, and it is also possible to set up the parameter values via the operating panel (not shown) of the color printing device 1.

In the first embodiment, as described in the above, if it is judged that the color material reduction printing mode is specified, the second selection circuit 18 of the color printing device 1 outputs the data that has been processed with the color material reduction process that includes the chroma conversion that reduces chroma for each pixel of bitmap that has been converted to colors of color materials to be used in the color printing device 1, and the under-color removal/black generation that replaces at least a portion of the achromatic component generated by overlaying a plurality of color materials.

Therefore, the present embodiment is applicable of printing without relying on the host computer, without requiring a lot of data resources in order to correspond with various printing data formats and color spaces, and is capable of reducing the color material consumption without extremely reducing the legibility of printed images.

Although the setup in the color material reduction process is set up separately for each type of printing object in the present embodiment, the present invention is not limited to it, but the same parameters can be set up for all objects as well. Moreover, although the types of printing objects was classified into image objects and non-image objects in the above, the invention does not have to be limited to it but rather it is possible to have a classification with more than two categories, e.g., image objects, graphics objects, and text objects.

Next, the second embodiment will be described below focusing primarily on the differences from the first embodiment. Descriptions of those points having commonalities with the first embodiment will be skipped.

Figure 7:
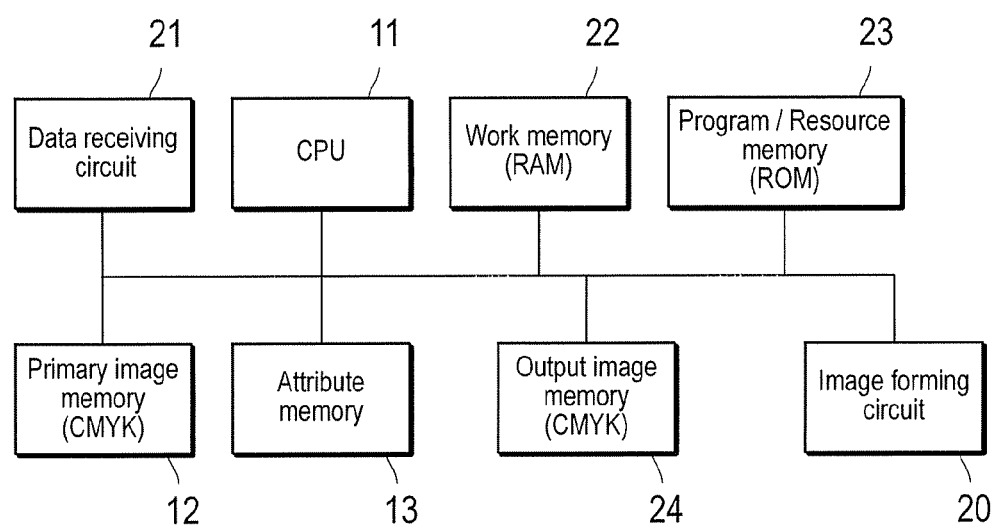
FIG. 7 is a block diagram showing the constitution of a color printing device 1a according to the second embodiment of the invention.

FIG. 7 is a block diagram showing the constitution of a color printing device 1a using a color printing control device according to the second embodiment of the present invention. The color printing device 1a shown in FIG. 7 is an electronic photograph type color printer using four color toners of CMYK. The two systems are different in that, while the function of executing the color material reduction process for reducing the consumption of the color materials is constituted in hardware in the first embodiment, the function of executing the color material reduction process is constituted in software in the second embodiment.

The color printing device 1a comprises a CPU 11 that controls various internal parts of the color printing device 1a and executes various arithmetic processes; a primary image memory 12 that stores image data obtained by the analysis of the inputted printing data; an attribute memory 13 for storing attribute data of objects to which each pixel of the image data developed in the primary image memory 12 belongs; a data receiving circuit 21 that receives printing data; a work memory (RAM) 22 that stores the program and data temporarily as the work area; a program/resource memory (ROM) 23 that stores various programs and data; an output image memory 24 that stores output image data for image formation; and an image forming circuit 20 that controls printing based on the output image data.

The data receiving circuit 21 is a LAN card used to communicate with external equipment via the network, on which the standards such as Ethernet, TokenRing, and FDDI are used. However, the color printing device 1a can be connected with the external equipment with local connections. This local connection can be accomplished by means of various local connection interfaces, such as serial interfaces, e.g., USB and IEEE 1394, parallel interfaces, e.g., SCSI and IEEE 1284, wireless communication interfaces, e.g., Bluetooth®, IEEE 802.11, HomeRF®, IrDA®, etc.

FIG. 7 shows those of the constituents of the color printing device 1a that are mainly related to the present invention, while the color printing device 1a may contain constituents other than those constituents described above, or may not contain a certain portion of the constituents described above.

Figure 8:
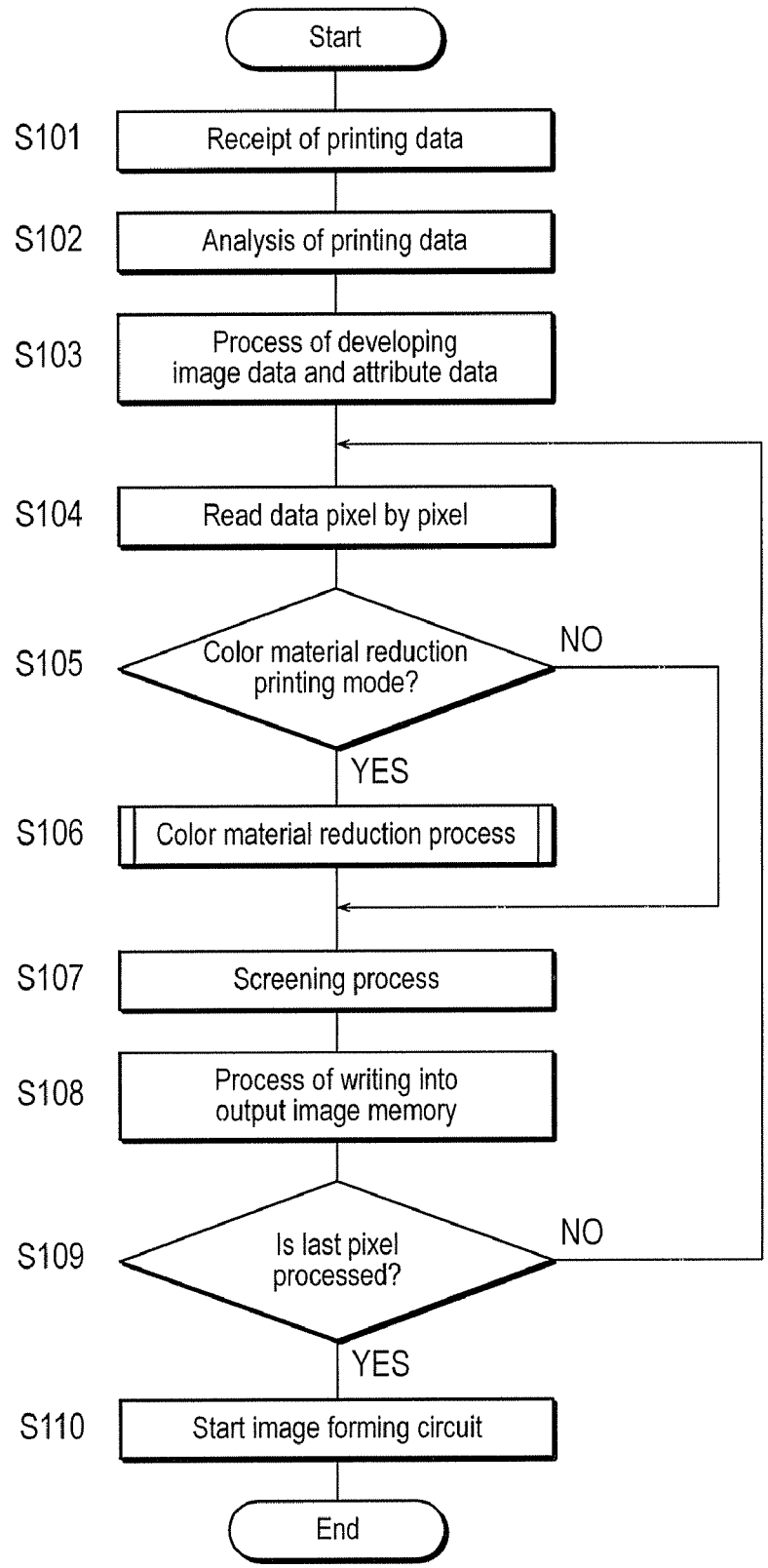
Figure 9:
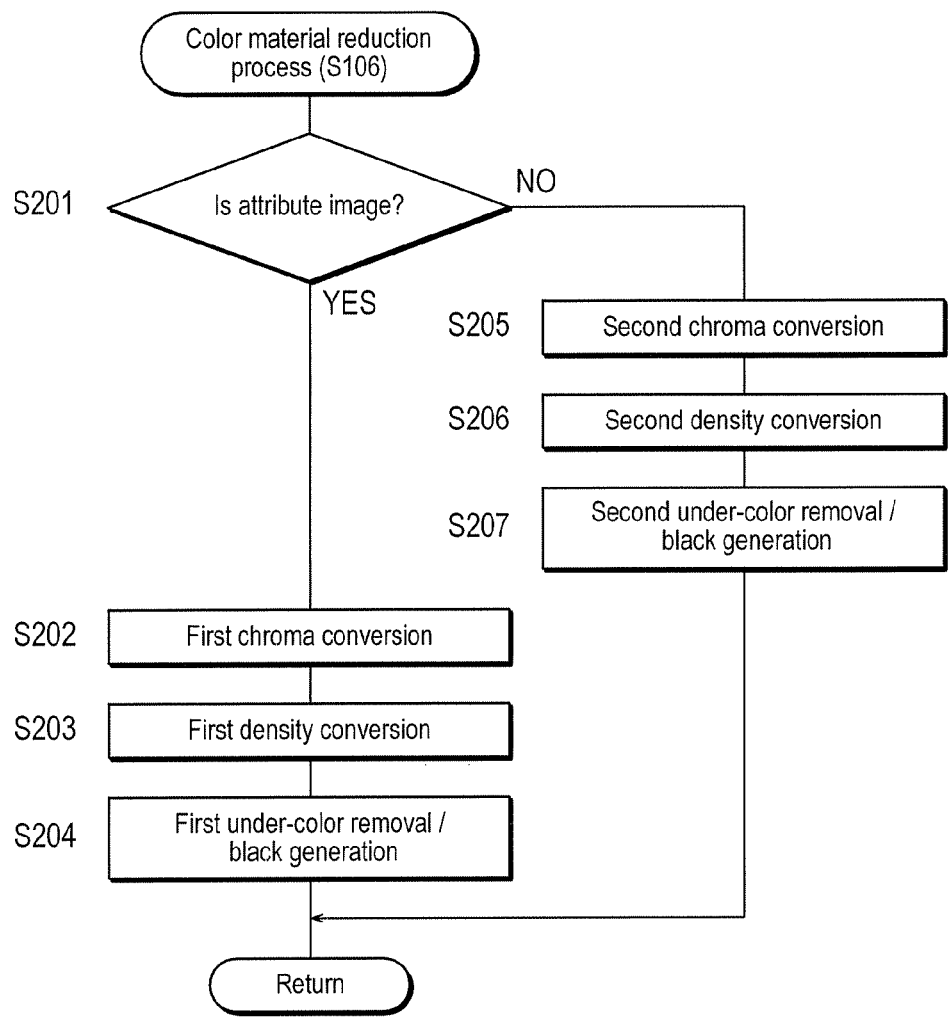
FIG. 9 is a flowchart showing the procedure of the color material reduction process.

Next, the process in the color printing device 1a will be described below referring to FIG. 8 and FIG. 9. The algorithm shown in the flowcharts of FIG. 8 and FIG. 9 is stored as a program in a storage unit such as the program/resource memory (ROM) 23 of the color printing device 1a and is executed by the CPU 11 on the work memory (RAM) 22.

First, the color printing device 1a receives printing data at the data receiving circuit 21 from a device outside of the color printing device 1a, e.g., an upper level device (host computer) such as a PC (personal computer), via a printer interface (not shown) (S101).

The CPU 11 analyzes the received printing data (S102). The CPU 11 then develops (printing) image data of 32 bit (8 bit*4 colors) color converted to CMYK colors which are the color material colors to be used in the color printing device 1a into the primary image memory 12 in accordance with the particular printing data. (S103) The CPU 11 also sets up the attribute data that shows the attributes of each pixel of the image data developed into the image memory 12 into the attribute memory 13 (S103). The attributes contain the types of print objects to which the particular pixel belongs and the types of the print objects are classified at least into image objects and non-image objects. In the present embodiment, attribute values are set up as the attribute data for identifying whether the object attributes are either image objects or non-image objects.

After the data development is completed into the primary image memory 12 and the attribute memory 13, the CPU 11 reads the image data and the attribute data into the work memory 22 by each pixel (S104).

In the step S105, a judgment is made as to whether the color material reduction printing mode is specified or not. In other words, it is judged whether or not the color material reduction printing mode is specified in the received printing data. However, the color material reduction printing mode can be specified based on the user's instruction via menu or switches on the operating panel (not shown) of the color printing device 1a. If it is judged that the color material reduction printing mode is not specified (S105: No), the program advances to step S107.

If it is judged that the color material reduction printing mode is specified (S105: Yes), the color material reduction process is executed (S106).

As shown in FIG. 9, the conversion processes: i.e., chroma conversion, density conversion, and under-color removal/black generation; are done sequentially in the color material reduction process. The algorithms of these conversion processes are identical to the algorithms of chroma conversion (FIG. 2, FIG. 3), density conversion (FIG. 4), and under-color removal/black generation (FIG. 5 and FIG. 6) described in the first embodiment.

First, the attribute data of a pixel is referenced, and a judgment is made as to whether the attribute of the particular pixel is an image object or not (S201).

When the attribute of the pixel is judged to be an image object (S201: Yes), the first chroma conversion (S202), the first density conversion (S203), and the first under-color removal/black generation (S204) are executed sequentially. The processes of the first chroma conversion (S202), the first density conversion (S203), and the first under-color removal/black generation (S204) are identical to those of the processes of the first chroma conversion circuit 151, the first density conversion circuit 152, and the first under-color removal/black generation circuit 153.

On the other hand, if the attribute of the pixel is judged to be that of a non-image object (S201: No), the second chroma conversion (S205), the second density conversion (S206), and the second under-color removal/black generation (S207) are executed sequentially.

The processes of the second chroma conversion (S205), the second density conversion (S206), and the second under-color removal/black generation (S207) are identical to those of the processes of the second chroma conversion circuit 161, the second density conversion circuit 162, and the second under-color removal/black generation circuit 163 in the first embodiment.

Thus, the color material reduction process (conversion process) can be executed using different parameters depending on whether the attribute of a pixel is that of an image object or a non-image object.

A screening process is executed using the result of the color material reduction process as an input if the color material reduction mode is specified, or using the pixel data read from the primary image memory 12 as an input if the color material reduction mode is not specified (S107). Next, the result of the screening process is written into the output image memory 24 (S108).

In the step S109, a judgment is made as to whether the screening process is completed down to the last pixel or not. If the screening process is not completed down to the last pixel (S109: No), the program returns to step S104.

If it is judged that the screening process is not completed down to the last pixel (S109: Yes), the CPU 11 initiates the image forming circuit 20 (S110). The image forming circuit 20 reads the pixel data from the output image memory 24 to execute printing.

As seen in the above, the second embodiment, same as in the first embodiment, is applicable of printing without relying on the host computer, without requiring a lot of data resources in order to correspond with various printing data formats and color spaces, and is capable of reducing the color material consumption without extremely reducing the legibility of printed images.

Next, the third embodiment will be described below focusing primarily on the differences from the second embodiment. Descriptions of those points having commonalities with the second embodiment will be skipped.

Figure 10:
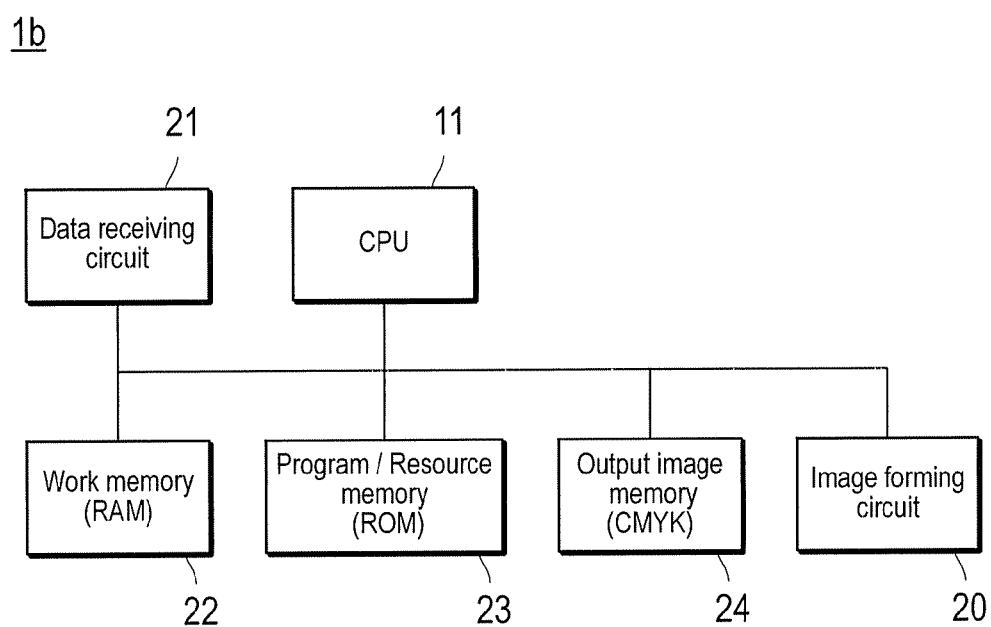
FIG. 10 is a block diagram showing the constitution of a color printing device 1b according to the third embodiment of the invention.

FIG. 10 is a block diagram showing the constitution of a color printing device 1b using a color printing control device according to the third embodiment of the present invention. The color printing device 1b shown in FIG. 10 is an electronic photograph type color printer using four color toners of CMYK. While the color material reduction process is applied to each pixel of the bitmap converted to the color material color to be used in the color printing device in the second embodiment, the difference of the third embodiment is that the color data inputted into the color printing device is converted to the color material color to be used in the color printing device using the color conversion profile for the color material reduction that allows the color material reduction process to be executed simultaneously.

The color printing device 1b comprises a CPU 11 that controls various internal parts of the color printing device 1b and executes various arithmetic processes; a data receiving circuit 21 that receives printing data; a work memory (RAM) 22 that stores the program and data temporarily as the work area; a program/resource memory (ROM) 23 that stores various programs and data; an output image memory 24 that stores output image data for image formation; and an image forming circuit 20 that controls printing based on the output image data.

FIG. 10 shows those of the constituents of the color printing device 1b that are mainly related to the present invention, while the color printing device 1b may contain constituents other than those constituents described above, or may not contain a certain portion of the constituents described above.

Figure 11:
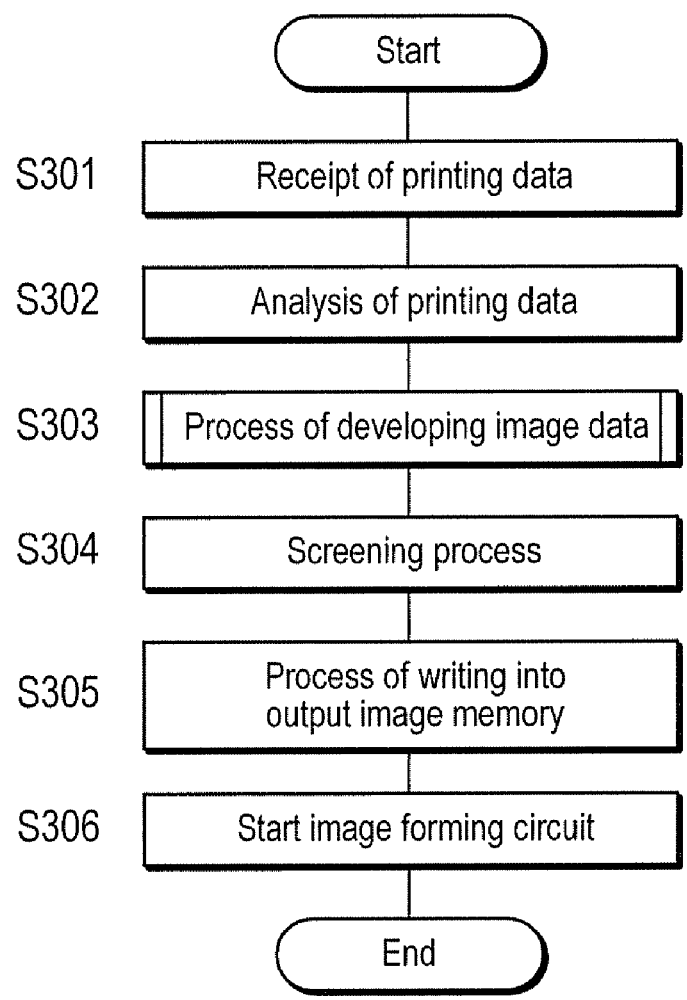
FIG. 11 is a flow chart showing the process procedure on the color printing device 1b.
Figure 12:
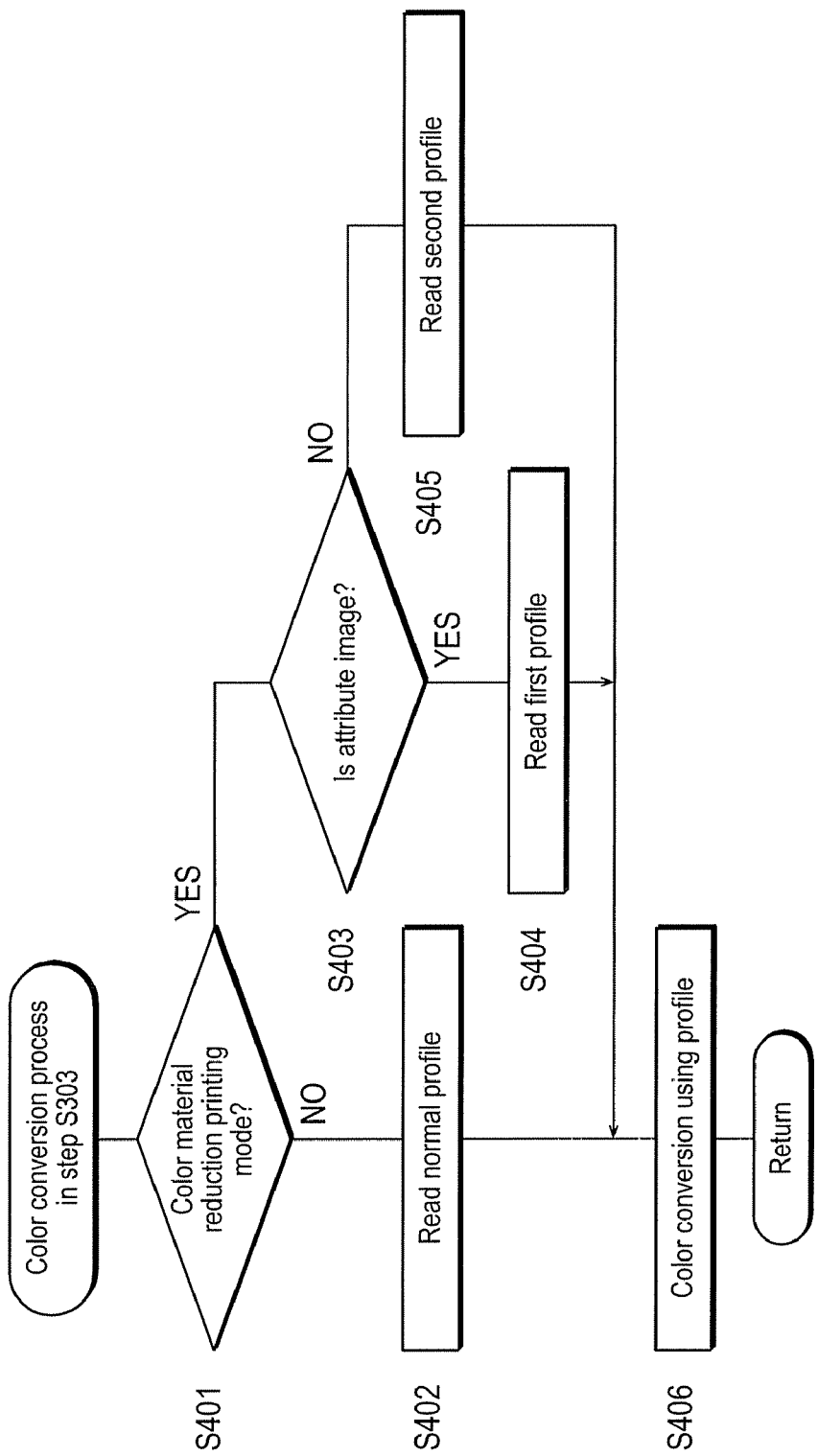
FIG. 12 is a flowchart showing the sequence of the color conversion process.

Next, the process in the color printing device 1b will be described below referring to FIG. 11 and FIG. 12. The algorithm shown in the flowcharts of FIG. 11 and FIG. 12 is stored as a program in a storage unit such as the program/resource memory (ROM) 23 of the color printing device 1b and is executed by the CPU 11 on the work memory (RAM) 22.

First, the color printing device 1b receives printing data at the data receiving circuit 21 from a device outside of the color printing device 1b, e.g., an upper level device (host computer) such as a PC (personal computer), via a printer interface (not shown) (S301).

The CPU 11 analyzes the received printing data (S302) The CPU 11 then develops (printing) image data of 32 bit (8 bit*4 colors) color converted to CMYK colors which are the color material colors to be used in the color printing device 1b into the output image memory 24 in accordance with the particular printing data (S303).

When the colors of a printing object of the printing data received by the data receiving circuit 21 are converted into the color material colors CMYK of the color printing device 1b, the CPU 11 conducts a color conversion process using the color profile of the color printing device 1b.

First, in the color conversion process of the present embodiment, a judgment is made as to whether the color material reduction printing mode is specified or not as shown in FIG. 12 (S401). In other words, it is judged whether or not the color material reduction printing mode is specified in the received printing data. However, the color material reduction printing mode can be specified based on the user's instruction via menu or switches on the operating panel (not shown) of the color printing device 1b.

If it is judged that the color material reduction printing mode is not specified (S401: No), the program advances to the step S402 and the normal profile is read into the work memory 22.

On the other hand, if it is judged that the color material reduction printing mode is specified (S401: Yes), a judgment is made as to whether the attribute is that of the image object or not (S403). If it is judged that the attribute is that of an image object (S403: Yes), the first profile is read into the work memory 22 (S404); on the other hand, if it is judged that the attribute is that of a non-image object (S403: No), the second profile is read into the work memory 22 (S405).

The first profile is a color conversion profile adjusted to be used for the image object color material reduction printing mode, and is a profile for executing the same processes as the processes to be executed in the first chroma conversion circuit 151, the first density conversion circuit 152, and the first under-color removal/black generation circuit 153 in the first embodiment simultaneously with color conversion. The second profile is a color conversion profile adjusted to be used for the non-image object color material reduction printing mode, and is a profile for executing the same processes as the processes to be executed in the second chroma conversion circuit 161, the second density conversion circuit 162, and the second under-color removal/black generation circuit 163 in the first embodiment simultaneously with color conversion.

The color data entered into the color printing device 1b is color converted to the color material colors CMYK of the color printing device 1b using the profile read into the work memory 22 (S406).

Thus, the color conversion accompanying the color material reduction process can be executed using different parameters depending on whether the attribute is that of an image object or a non-image object. It is preferable that the process shown in FIG. 12 is executed for each object.

Returning back to the flowchart of FIG. 11, the screening process is executed on the image data on which the color conversion has been applied. Next, the result of the screening process is written into the output image memory 24 (S305).

After the screening process is completed, the CPU 11 initiates the image forming circuit 20 (S306). The image forming circuit 20 reads the pixel data from the output image memory 24 to execute printing.

In the present embodiment, the first profile and the second profile are provided as the color conversion profiles. The first profile and the second profile are adjusted in such a way that the results similar to those of the pixel conversion using the algorithm shown in the first embodiment. As the color conversion profile, the ICC (International Color Consortium) color profile is used here. Once the pixel conversion parameters for the normal printing mode are determined, the color conversion profiles (the first and second profiles) can be easily generated from the color conversion file for the normal printing mode. Most of the color conversion profiles for printing devices use a three dimensional lookup table called CLUT, so that the color conversion profile for the color material reduction mode can be easily generated by replacing the CMYK output values of each grid within the lookup table in accordance with the pixel conversion parameters and the conversion algorithm.

As seen in the above, the third embodiment, same as in the first or second embodiment, is applicable of printing without relying on the host computer, without requiring a lot of data resources in order to correspond with various printing data formats and color spaces, and is capable of reducing the color material consumption without extremely reducing the legibility of printed images. Also, since the color material reduction process and the color conversion process are executed simultaneously, it is possible to expedite the process during the color material reduction mode.

Next, the fourth embodiment will be described below focusing primarily on the differences from the first embodiment. Descriptions of those points having commonalities with the first embodiment will be skipped.

In the first embodiment, the chroma conversion ratio that represents the ratio of the chroma after the conversion relative to the chroma before the conversion, and the density conversion ratio that represents the ratio of the density after the conversion relative to the density before the conversion are preset as parameters. On the other hand, the chroma conversion ratio is set up for each pixel depending on the chroma of the pixel to be processed in the chroma conversion of the fourth embodiment. Also, the density conversion ratio is set up for each pixel depending on the density of the pixel to be processed in the density conversion of the fourth embodiment.

Figure 13:
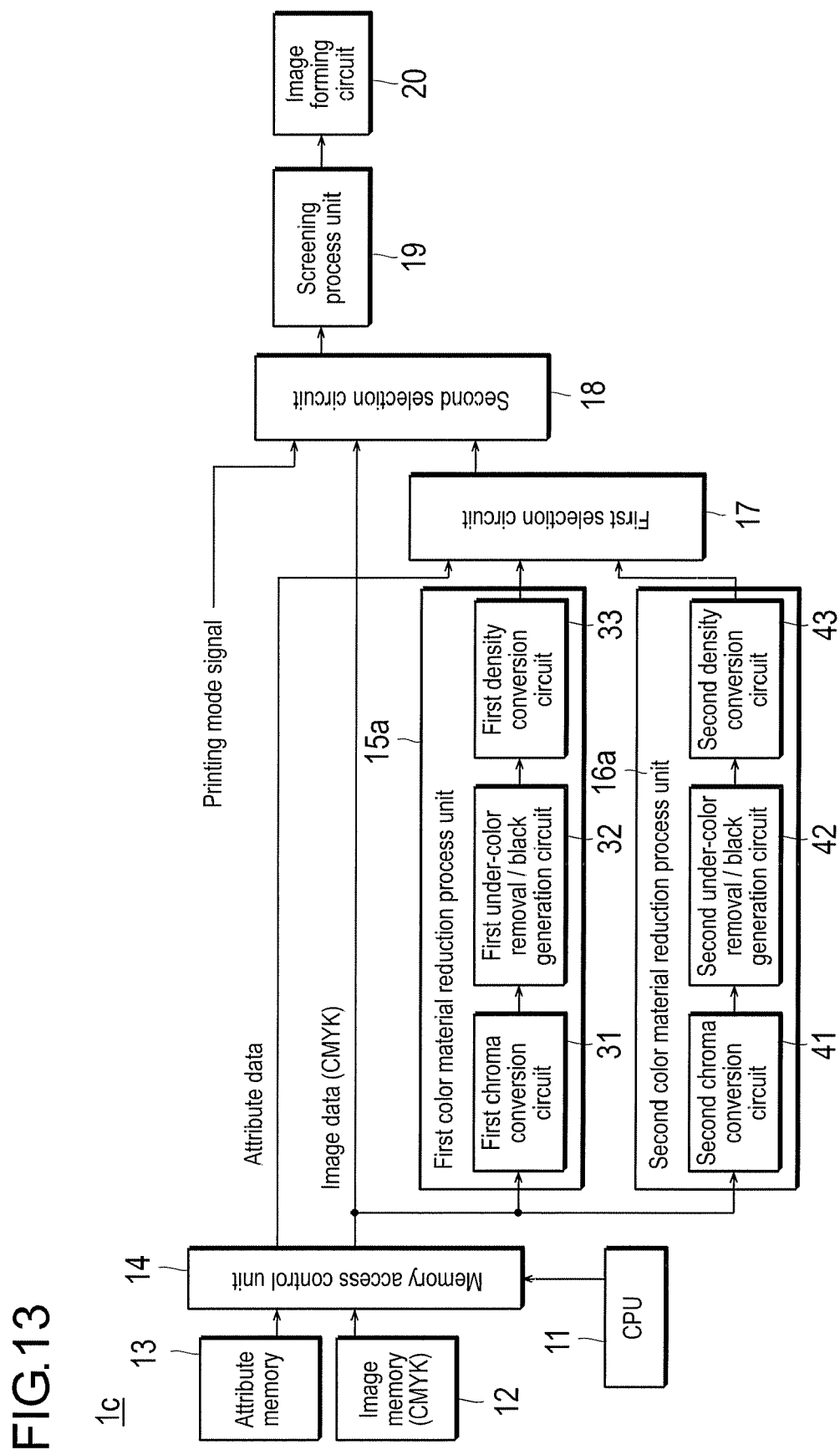
FIG. 13 is a block diagram showing the constitution of a color printing device 1c using a color printing control device according to a fourth embodiment of the present invention.

FIG. 13 is a block diagram showing the constitution of a color printing device 1c using a color printing control device according to the fourth embodiment of the present invention.

The color printing device 1c is equipped with a CPU 11 that controls various parts and executes various arithmetic processes in the color printing device 1c; an image memory 12 that stores (printing) image data obtained by analyzing the entered printing data; an attribute memory 13 that stores attribute data of objects to which pixels of image data developed in the image memory 12 belong; a memory access control unit 14 that sequentially causes the image data and attributes data to be sent out from the image memory 12 and the attribute memory 13 respectively; a first color material reduction process unit 15a and a second color material reduction process unit 16a that reduce the color material consumption amount; a first selection circuit 17 that selects either the output data of the first color material reduction process unit 15 or the output data of the second color material reduction process unit 16a in accordance with the attribute data; a second selection circuit 18 either the image data (pixel data) read out from the image memory or the output data of the first selection circuit 17 in accordance with the printing mode signal; a screening process unit 19 that generates image data with which image can be formed using a gradation reproduction method such as a dither method; and an image forming circuit 20 that performs printing control based on the image data received.

The first color material reduction process unit 15a and the second color material reduction process unit 16a are functional blocks that independently convert CMYK densities of image data. The first color material reduction process unit 15a and the second color material reduction process unit 16a are different to each other in terms of the process contents.

The first color material reduction process unit 15a includes a first chroma conversion circuit 31, a first under-color removal/black generation circuit 32, and a first density conversion circuit 33, while the second color material reduction process unit 16a includes a second chroma conversion circuit 41, a second under color removal/black generation circuit 42, and a second density conversion circuit 43. The first chroma conversion circuit 31 and the second chroma conversion circuit 41 are the circuits for reducing chroma, and the first under-color removal/black generation circuit 32 and the second under-color removal/black generation circuit 42 are for replacing at least a portion of the achromatic components generated by overlaying a plurality of color materials with achromatic color material, and the first density conversion circuit 33 and the second density conversion circuit 43 are the circuits for reducing densities.

FIG. 13 shows those of the constituents of the color printing device 1c that are mainly related to the present invention, while the color printing device 1c may contain constituents other than those constituents described above, or may not contain a certain portion of the constituents described above.

Next, the operation of the color printing device 1c constituted as above will be described.

The color printing device 1c is equipped with a color material reduction printing mode for printing while reducing the color material consumption.

The CPU 11 analyzes the printing data received at a data receiving circuit via a printer interface (not shown), and develops the image data of 32 bit (8 bit*4 colors) data color converted into CMYK, which are the color material color to be used in the color printing device 1, into the image memory 12 in accordance with the particular printing data. The CPU 11 sets up the attribute data that shows the attributes of each pixel of the image data developed into the image memory 12 into the attribute memory 13. The attributes contain the types of print objects to which the particular pixel belongs and the types of the print objects are classified at least into image objects and non-image objects. In the present embodiment, attribute values are set up as the attribute data for identifying whether the object attributes are either image objects or non-image objects.

The memory access control unit 14 controls in such a way as to cause the image data and the attribute data to be sent out from the image memory 12 and the attribute memory 13 respectively in accordance with an instruction from the CPU 11.

Each circuit contained in the first color material reduction process unit 15a and the second color material reduction process unit 16a executes conversion on the received image data.

Figure 14:
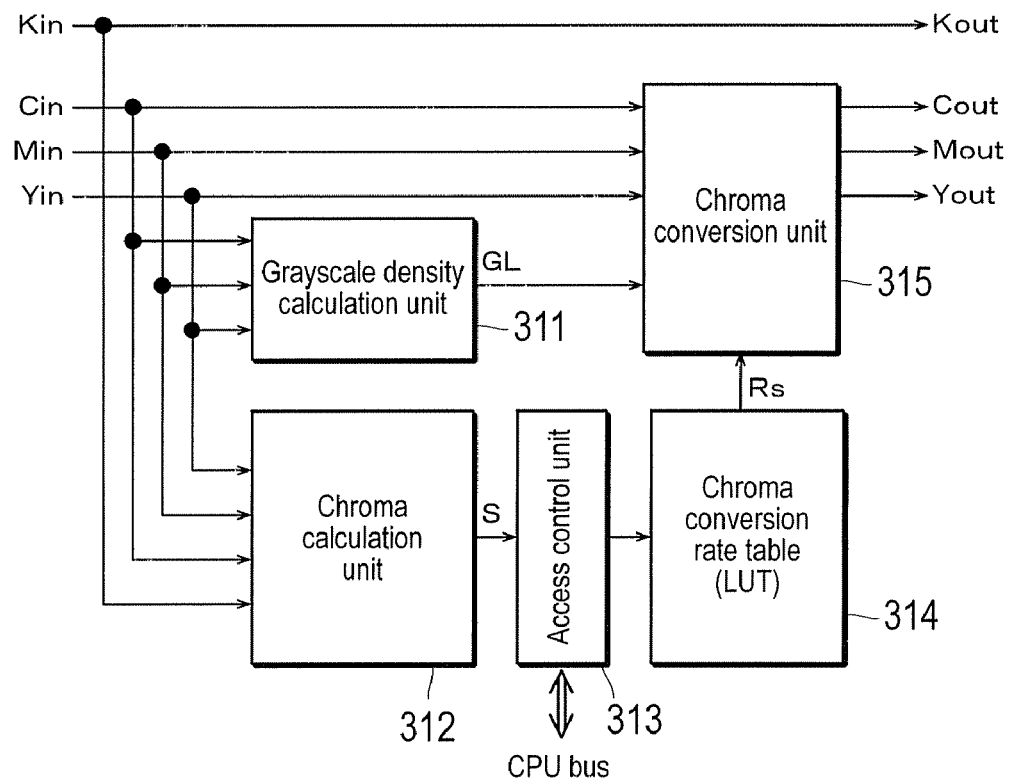
FIG. 14 is a diagram showing the constitution of a first chroma conversion circuit and a second chroma conversion circuit.

Next, the operations at the first chroma conversion circuit 31 and the second chroma conversion circuit 41 with reference to FIG. 14 and FIG. 15. FIG. 14 is a diagram showing the constitution of the first chroma conversion circuit 31 and the second chroma conversion circuit 41, while FIG. 15 is a diagram showing an algorithm for chroma conversion.

As shown in FIG. 14, a grayscale density calculation part 311 is a circuit for calculating the grayscale density GL when only the CMY (chromatic) components are converted into grayscale.

A chroma calculation part 312 is a circuit for calculating the chroma S of the input pixel.

A chroma conversion ratio table 314 is a lookup table (LUT) for acquiring the chroma conversion ratio calculating data Rs corresponding to the chroma S of the input pixel (FIG. 24) and consists of a RAM. The RAM that constitutes the LUT 314 is connected to the CPU bus via an access control part 313. Thus, the chroma conversion ratio table 314 can be arbitrarily set up.

The chroma conversion part 315 conducts chroma conversion by converting the densities of the CMY (chromatic color) components referencing the grayscale density GL and the chroma conversion ratio calculation data Rs. In other words, the chroma conversion is executed by converting the densities of C, M, and Y while maintaining the K component.

Specifically, the grayscale density GL is calculated by the formula shown in FIG. 15. Considering CMY as the complimentary colors of RGB, the CMY grayscale density conversion formula ($GL=(C*5+M*9+Y*2)/16$) is deducted from the known RGB grayscale conversion formula (NTSC; $Y=0.299R+0.587G+0.114B$).

Specifically, the chroma S is calculated by the formula shown in FIG. 15. MaxValue (X, Y) here is a function of returning the larger one of X and Y, while MinValue (X, Y) is a function of returning the smaller one of X and Y.

The chroma S of the pixel calculated does not necessarily have to a chroma defined by various color spaces such as HSL, Ycc, and L*a*b*, it can be any index value indicating the level of chroma. In the present embodiment, the index value of the chroma is calculated assuming that the chromatic component consisting of the maximum density difference of the CMY (chromatic color) components is reduced by (under-color component of CMY+K density component). The chroma is reduced resultantly by the chroma conversion. In the present embodiment, the system is constituted in such a way that the chroma conversion ratio is set up corresponding to the chroma of the pixel to be treated. Consequently, the chroma S (index value) is calculated by the formula shown in FIG. 15 more accurately than in the first embodiment.

Specifically, the chroma S is calculated by the formula shown in FIG. 15. In other words, the densities of CMY are converted by maintaining the K component referencing the grayscale density GL and the data Rs for calculating the chroma conversion ratio.

The chroma conversion ratio is set up for each pixel depending on the chroma of the pixel to be processed in the chroma conversion of the present embodiment. More specifically, the chroma conversion ratio of the first pixel is set up to be greater than the chroma conversion ratio of the second pixel, which has a lower chroma than that of the first pixel. In other words, the rate of reducing the chroma of the first pixel is set up smaller than the rate of reducing the chroma of the second pixel, which has a lower chroma than that of the first pixel.

The RAM that constitutes the chroma conversion ratio table (LUT) 314 is an 8 bit type RAM. The output value set up in the LUT 314 is the data Rs for the chroma conversion ratio calculation. It shows that chroma conversion ratio is 100% when the data Rs (output value) for the chroma conversion ratio calculation is "128." Also, it shows that the chroma conversion ratio is 50% when the data Rs (output value) for the chroma conversion ratio calculation is "64" (see FIG. 24). In other words, the chroma conversion ratio is given as Rs/128 (%).

As can be seen in the above, the chroma component consisting of the maximum density difference of the CMY (chromatic color) components is converted in accordance with the data Rs for the chroma conversion ratio calculation outputted from the chroma conversion ratio table 314 in the chroma conversion of the present embodiment. In the calculation of the chroma, the chroma (chroma index value) is calculated assuming that "the chromatic component consisting of the maximum density difference of the CMY (chromatic color) components is reduced by (under-color component of CMY+K density component)." However, in order to make the calculation simpler, only the chroma component consisting of the maximum density difference of the CMY (chromatic colors) is treated as the target of the conversion.

Figure 16:
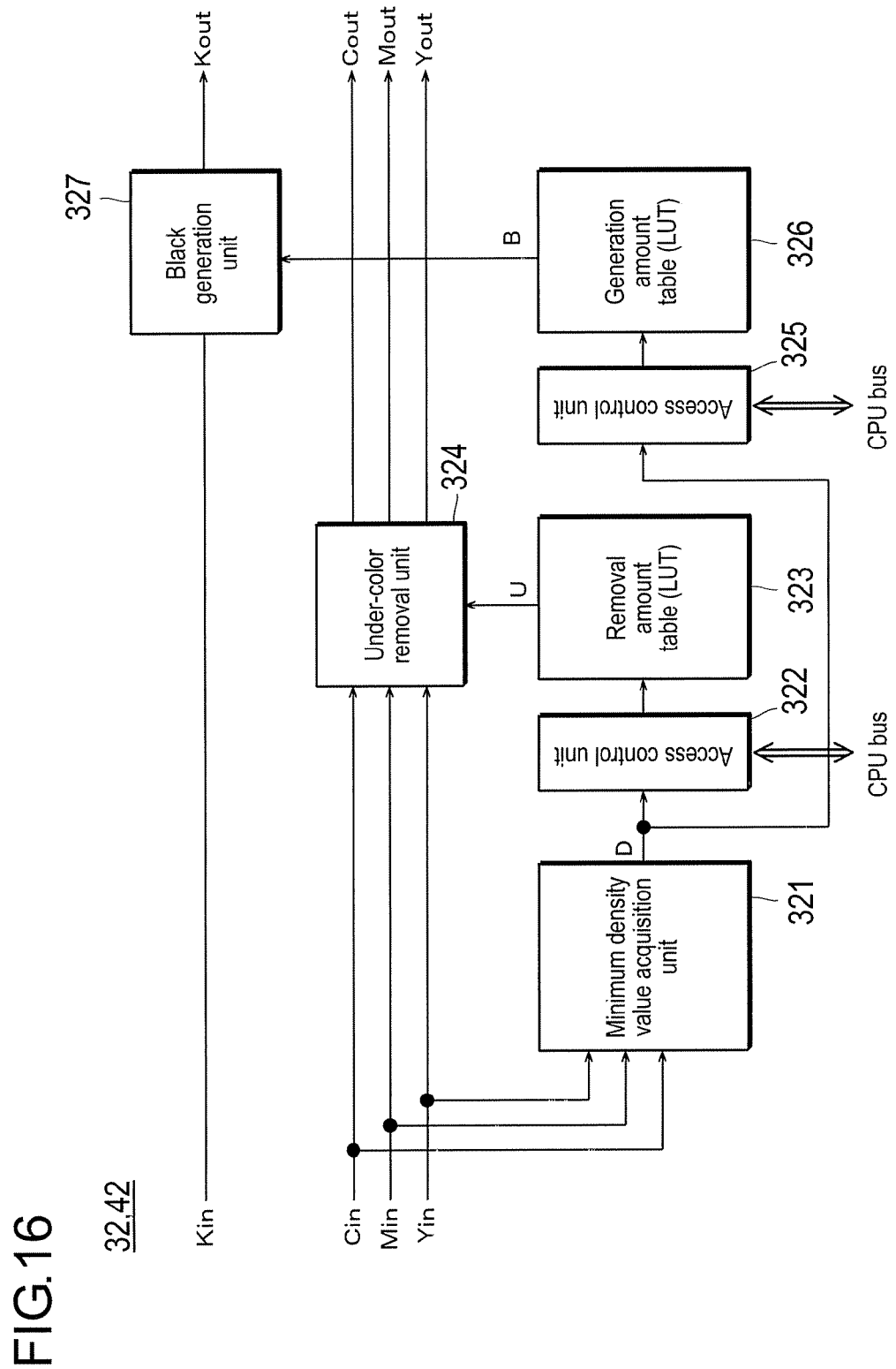
FIG. 16 is a diagram showing a constitution of a first under-color removal/black generation circuit and a second under-color removal/black generation circuit.

Next, the operations at the first under-color removal/black generation circuit 32 and the second under-color removal/black generation circuit 42 will be described with reference to FIG. 16 and FIG. 17. FIG. 16 is a diagram showing the constitution of the first under-color removal/black generation circuit 32 and the second under-color removal/black generation circuit 42, while FIG. 17 is a diagram showing an algorithm for under-color removal/black generation.

A minimum density value acquisition part 321 is a circuit for acquiring the minimum density value of the CMY (chromatic color) components to be inputted as shown in FIG. 16. The minimum density value here represents the under-color component D of the CMY (chromatic color) components.

A removal amount table 323 is a lookup table (LUT) for acquiring the under-color removal amount U corresponding to the under-color component D of the input pixel (FIG. 24) and consists of a RAM. The RAM that constitutes the LUT 323 is connected to the CPU bus via an access control part 322. Thus, the removal amount table 323 can be arbitrarily set up.

An under-color removal part 324 reduces each density of the CMY (chromatic color) components to be inputted by the under-color removal amount respectively.

A generation amount table 326 is a lookup table (LUT) for acquiring the black generation amount B corresponding to the under-color component D of the input pixel (FIG. 24) and consists of a RAM. The RAM that constitutes the LUT 326 is connected to the CPU bus via an access control part 325. Thus, the generation amount table 326 can be arbitrarily set up.

A black generation part 327 increases the K (achromatic color) to be inputted by the black generation amount B.

The calculation of the minimum density value D, the removal of the under-color, and the black generation are executed specifically according to the formula shown in FIG. 17.

The RAMs that constitute the removal amount table (LUT) 323 and the generation amount table (LUT) 326 are 8 bit type RAMs. The under-color removal amount U and the black generation amount B are directly set up to the LUT 323 and 326 according to the under-color component D.

Figure 18:
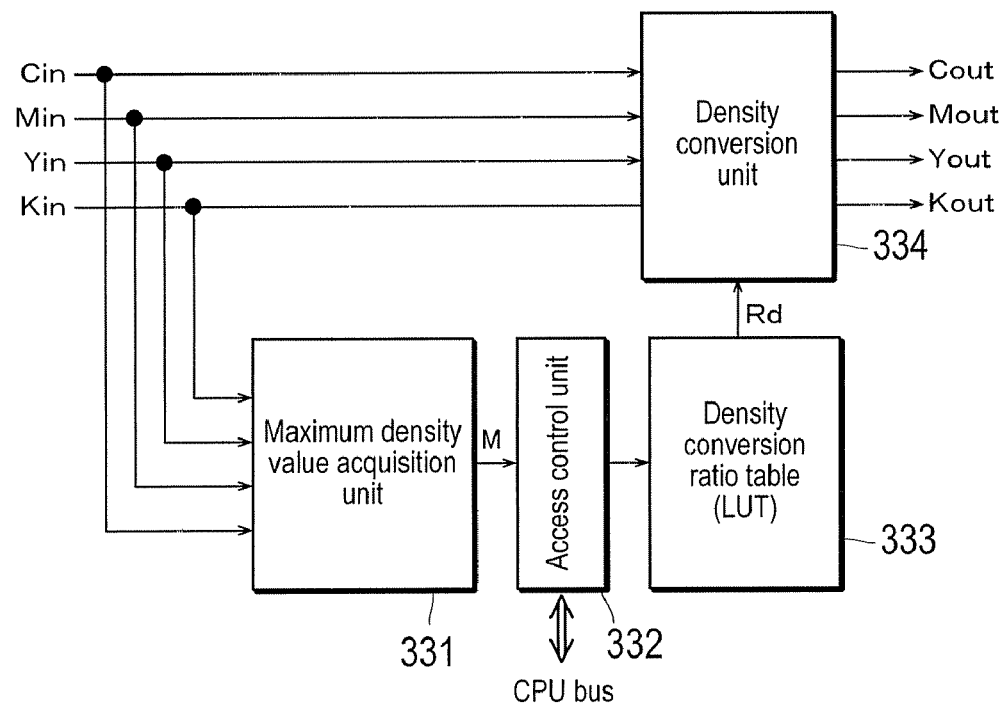
FIG. 18 is a diagram showing a constitution of a first chroma conversion circuit and a second chroma conversion circuit.

Next, the operations at the first density conversion circuit 33 and the second density conversion circuit 43 with reference to FIG. 18 and FIG. 19. FIG. 18 is a diagram showing the constitution of the first density conversion circuit 33 and the second density conversion circuit 43, while FIG. 19 is a diagram showing an algorithm for density conversion.

A maximum density value acquisition part 331 is a circuit for acquiring the maximum density value M of the CMYK (chromatic color) components to be inputted as shown in FIG. 18.

A density conversion ratio table 333 is a lookup table (LUT) for acquiring the density conversion ratio calculating data Rd corresponding to the maximum density M of the input pixel (FIG. 24) and consists of a RAM. The RAM that constitutes the LUT 333 is connected to the CPU bus via an access control part 332. Thus, the density conversion ratio table 333 can be arbitrarily set up.

A density conversion part 334 converts the density of the CMYK (color material) components based on the density conversion ratio calculating data Rd.

The calculation of the maximum density value M and the density conversion are executed specifically according to the formula shown in FIG. 19.

The density conversion ratio is set up for each pixel depending on the density of the pixel to be processed in the density conversion of the present embodiment. More specifically, the density conversion rate of the first pixel is set up to be greater than the density conversion ratio of the second pixel, which has a lower density than that of the first pixel. In other words, the rate of reducing the density of the first pixel is set up smaller than the rate of reducing the density of the second pixel, which has a lower density than that of the first pixel.

The RAM that constitutes the density conversion ratio table (LUT) 333 is an 8 bit type RAM. The output value set up in the LUT 333 is the data Rd for the density conversion ratio calculation. The density conversion ratio is 100% when the data Rd (output value) for the density conversion ratio calculation is "128." Also, it shows that the density conversion ratio is 50% when the data Rd (output value) for the density conversion ratio calculation is "64" (see FIG. 24). In other words, the density conversion ratio is given as Rs/128(%).

In the present embodiment, the first selection circuit 17 selects to output the output data of the first color material reduction process unit 15a, when the attribute data of a pixel shows that it is an image object, and selects to output the output data of the second color material reduction process unit 16a, when the attribute data of a pixel shows that it is a non-image object.

The second selection circuit 18 selects to output the output data of the first selection circuit 17, when the printing mode signal shows that it is a color material reduction mode, and selects to output the image data (pixel data) (to which no conversion is applied for a color material reduction) that is read from the image memory, when the printing mode signal shows that it is a normal printing mode.

Next, the effect of material reduction by means of chroma conversion and under-color removal/black generation will be described with reference to FIG. 20 and FIG. 21. In FIG. 20 and FIG. 21, the lengths of the bars of the bar graphs represent the density of each component. Also, in FIG. 20 and FIG. 21, density is expressed in percentage, and 100% density corresponds to "255" when density is expressed in terms of 8 bit digits (the same goes to density in FIG. 23).

FIG. 20(a) is a diagram showing an example of CMYK density of an input pixel and FIG. 20(b) is a diagram showing the result of a chroma conversion. The grayscale density GL of the CMY component in case of FIG. 20(a) is 50%, while the chroma component Scmy that consists of the maximum density difference of the CMY (chromatic color) components is 75%. The chroma (chroma index value) is 46.5% as calculated assuming that the chroma component Scmy is reduced by CMY (under-color components+K density component).

FIG. 20(b) shows the result of chroma conversion when the chroma conversion ratio that corresponds to the chroma (chroma index value) of 46.5% calculated from the combination of the CMYK densities of the index pixel of FIG. 20(a) is assumed to be 50%. The difference of each density of CMY colors from the grayscale density GL of CMY components is reduced based on the chroma conversion rate (50% in this case). The chroma component Scmy consisting of the maximum density difference of the CMY components is reduced by the amount that corresponds to the chroma conversion ratio and becomes 38%.

The reduction by the chroma component consisting of the maximum density difference of the CMY components results in an increase of the under-color component which will be described below. This increases the effect of color material reduction due to the under-color removal.

FIG. 21(a) is a diagram for describing the under-color component as a result of the chroma conversion shown in FIG. 20(b) and the under-color removal amount, while FIG. 21(b) is a diagram for showing a result of executing the under-color removal/black generation The under-color component Du is 38% in FIG. 21(a), and the under-color removal amount Dr is 25% as an example. FIG. 21(b) is a result of the conversion when the under-color removal/black generation is conducted assuming the black generation is equal to the under-color removal amount Dr in contrast to FIG. 20(a). The density value sum obtained by adding all the CMYK density values of FIG. 21(b) is reduced from the density value sum of FIG. 20(a) by the under-color removal amount*3−the black generation amount. In other words, the quantity of color materials to be used is reduced. FIG. 21 shows a case where the under-color removal amount is smaller than the under-color component (the under-color removal ratio is less than 100%). However, the largest effect of color material reduction effect is achievable when the under-color removal ratio is 100%.

Next, the effect of combining chroma conversion and under-color removal/black generation will be described.

The present embodiment makes it possible to reduce the color material reduction amount while maintaining as much as possible the chroma of highly chromatic colors that is suitable for color document proofing. In order to achieve such a goal, the degree of chroma reduction is set up low (i.e., a larger chromatic conversion ratio) for colors with higher chroma, such as red, used for enhancing certain areas as in many color documents.

On the other hand, the degree of chroma reduction is set up high (i.e., a smaller chromatic conversion ratio) in low chroma areas. This ends up in a larger increase of abovementioned under-color component in a low chroma area as a result of the chroma conversion, and a larger effect in the color material consumption reduction due to the combination of the chroma conversion and the under-color removal/black generation. In other words, a higher reduction of color materials results compared to a case of only the under-color removal/black generation is implemented.

Next, the effect of material reduction by means of density conversion will be described with reference to FIG. 22 and FIG. 23. The density conversion is an auxiliary means to achieve a further reduction of color material consumption.

In general, it is difficult to express contrasting density by means of pixel-level manipulation in printing using an electronic photography color printer. Thus, it is common to apply a binary process such as dither screen, error diffusion and the likes to image data in order to express contrasting density in printed images.

Figure 22:
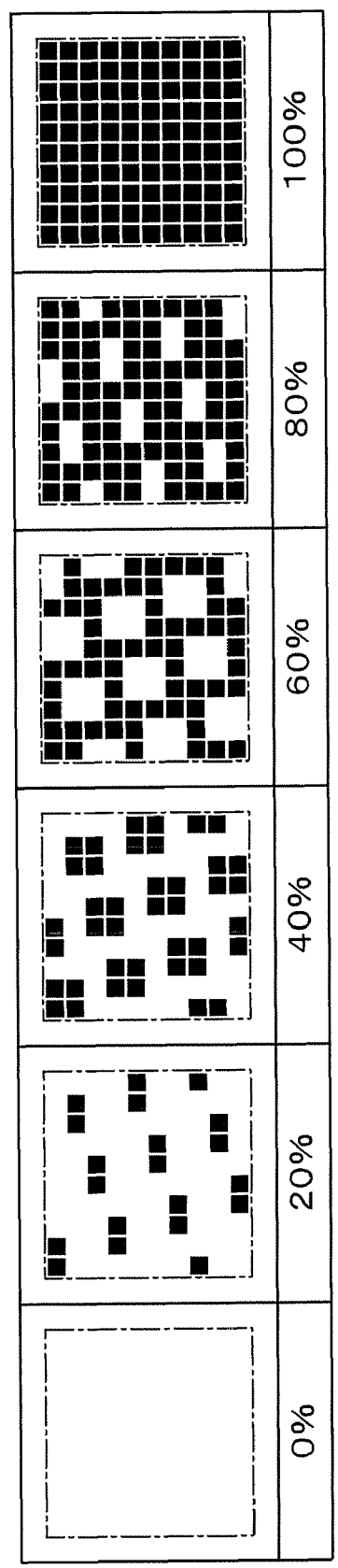
FIG. 22 is a diagram showing examples of dot patterns of grayscale expressions by means of a dither screen.

FIG. 22 is a diagram showing examples of dot patterns of grayscale expressions by means of a dither screen. The values written in FIG. 22 represent the ratios of dots placed in a unit area. The ratio of dots placed in a unit area is called "Dot Coverage" here.

The size of dots used in actual printing is larger than the pixel pitch in the printing resolution considering the quality and stability of printed images. Therefore, the dot coverage does not necessarily represent the density of a printed image. On the other hand, the dot coverage is approximately in proportion to the color material consumption.

Figure 23:
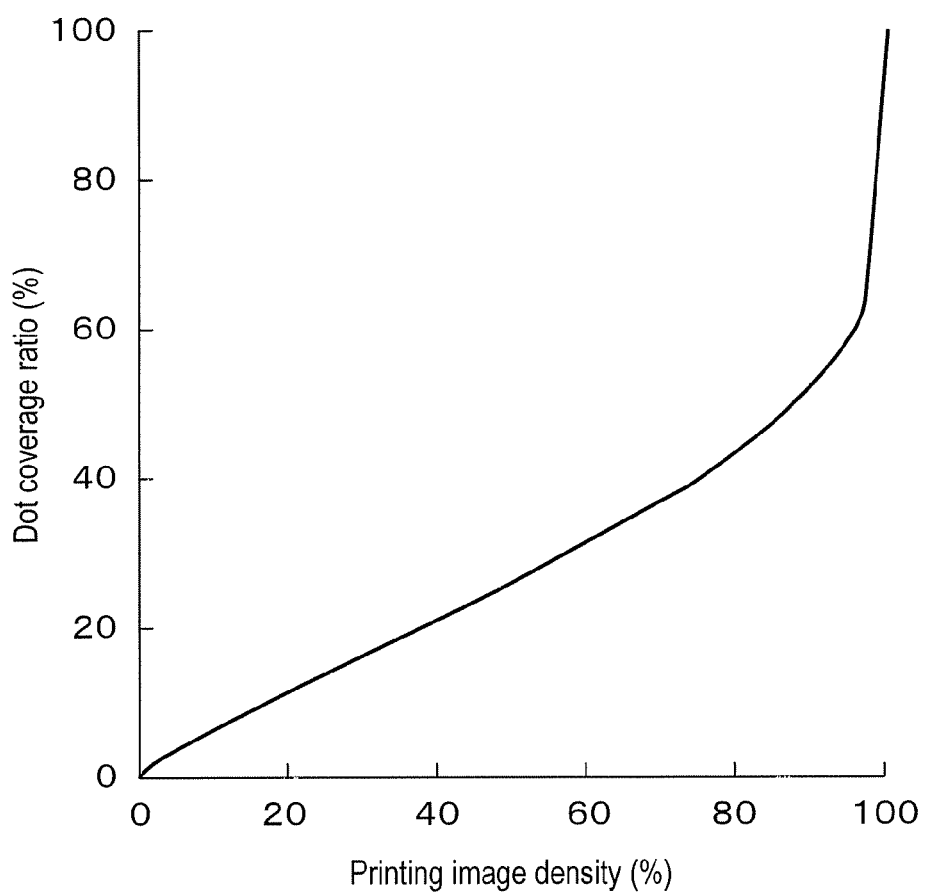
FIG. 23 is a graph showing a relation between printing image density and dot coverage.

FIG. 23 is a graph showing a relation between printing image density and dot coverage.

From FIG. 23, we see that a major dot coverage drop occurs as a result of a small printing density reduction in a high density area. For example, by reducing the printing density 10% from 100%, the dot coverage drops almost 50% from 100% to provide a large color material reduction effect. On the other hand, the dot coverage change is small relative to the density change in a low density area. For example, the dot coverage does not drop to a half unless the printing density is reduced approximately 20% from 40%. High chroma colors such as black (black characters) which is most popular in text printing and red used for enhancement areas in color documents contain either one of CMYK colors of high density of 100% or something close to it. Therefore, they can have a high color material reduction effect by reducing the printing density just a little.

In the present embodiment, the density of a color component of the highest density among all color components of an input pixel is obtained as the representative density. The degree of reducing the density of a pixel with a high representative density is set smaller than the degree of reducing the density of a pixel with a low representative density. This makes it possible to achieve a large effect in color material reduction while minimizing the reduction of legibility of high chroma colors such as black (black characters) which is most popular in text printing and red used for enhancement areas of color texts.

Figure 24:
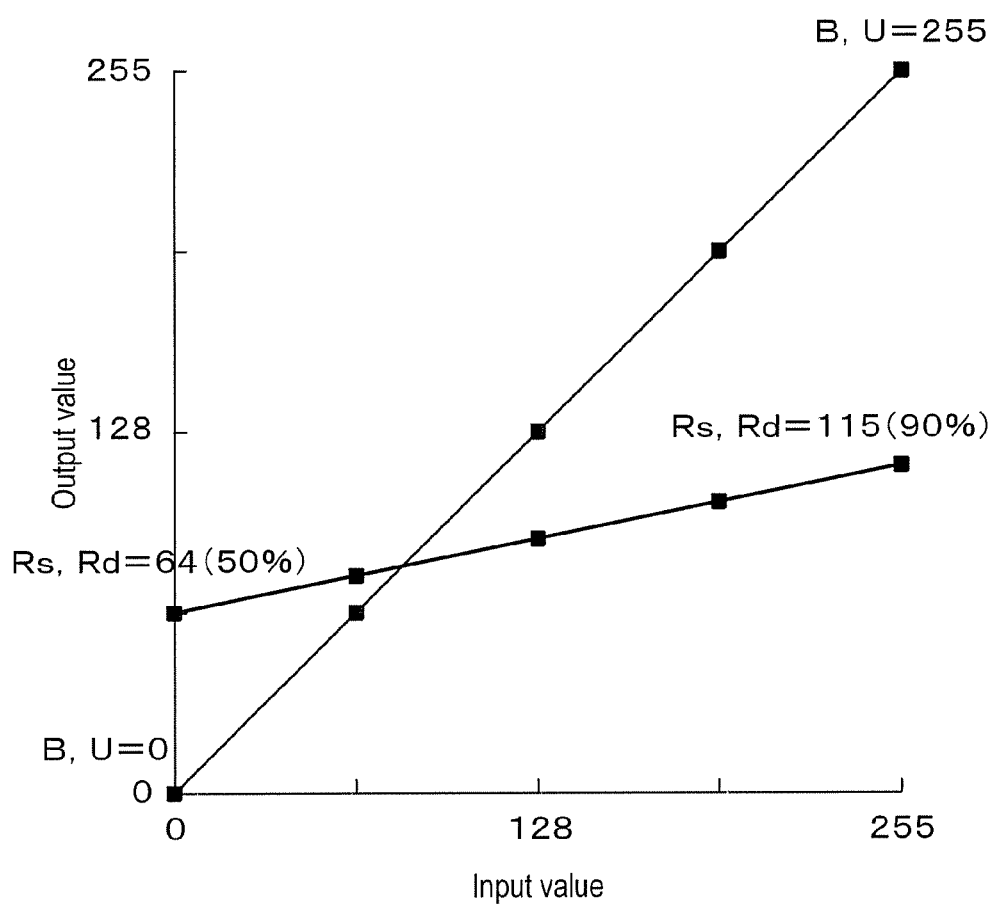
FIG. 24 is a diagram for describing an example of data set up on a chroma conversion ratio table, a removal amount table, a generation amount table, and a density conversion ratio table.

FIG. 24 is a diagram for describing an example of data set up on a chroma conversion rate table, a removal amount table, a generation amount table, and a density conversion rate table.

FIG. 24 shows examples of the data Rs for the chroma conversion ratio calculation corresponding to the chroma S (index value of chroma) of the input pixel, the under-color removal amount U corresponding to the under-color component D of the input pixel, the black generation amount B corresponding to the under-color component D of the input pixel, and the density conversion ratio calculating data Rd corresponding to the maximum density M of the input pixel.

The toner consumption when the test chart defined in the ISO/IEC 24712:2006 "Color test pages for measurement of office equipment consumable yield" was printed using each lookup table on which the data shown in FIG. 24 is set up in the color material reduction printing mode was 44.5% of the toner consumption when the same was printed in the normal printing (without color material reduction). Also, the toner consumption when the color patch of 216 colors (RGB 216-color patch) expressed as a combination of 0%, 20%, 40%, 60%, 80% or 100% of each one of three colors, i.e., red (R), green (G) and blue (B) was printed using each lookup table on which the data shown in FIG. 24 is set up in the color material reduction printing mode was 43.6% of the toner consumption when the same was printed in the normal printing (without color material reduction). Thus, the toner consumption in the color material reduction printing mode reduced to a half of that of the normal printing mode in both cases.

As is well known, the color material consumption in color printing is increased because of overlaying images of more than two colors. Also well known is that a reduction of color material consumption is already is practiced in some color printing jobs by replacing the non-chromatic color (gray) generated as a result of overlaying three color materials, C, M and Y, by another non-chromatic color (black). However, as mentioned before, the application of the under-color removal/black generation alone does not achieve the color material reduction effect.

In this embodiment, it is possible to reduce the amount of color materials to be consumed in printing by implementing conversion processes of "chromatic reduction," "density reduction (luminosity improvement)," and "under-color removal/black generation" in the first color material reduction process unit 15a and the second color material reduction process unit 16a when the color material reduction printing mode is specified.

Also, although the present embodiment is constituted in such a way as to obtain various conversion parameters by referencing the lookup tables, but the invention is not limited to it but rather can be constituted in such a way as to calculate various conversion parameters using numerical formulas.

As mentioned before, the chroma conversion ratio is set up for each pixel depending on the chroma of the pixel to be processed in the chroma conversion of the fourth embodiment. More specifically, the chroma conversion ratio of the first pixel is set up to be greater than the chroma conversion ratio of the second pixel, which has a lower chroma than that of the first pixel Therefore, in addition to be able to achieve the similar operational effect as in the first embodiment, the fourth embodiment makes it possible to reduce color material consumption while maintaining the chroma of highly chromatic colors. This makes it possible to achieve operational effect of minimizing the dulling of colors of high chroma such as red used in enhancement areas of various color documents.

Also, the density conversion ratio is set up for each pixel depending on the density of the pixel to be processed in the density conversion of the fourth embodiment. More specifically, the density conversion rate of the first pixel is set up to be greater than the density conversion ratio of the second pixel, which has a lower density than that of the first pixel High chroma colors such as black (black characters) which is most popular in text printing and red used for enhancement areas in color documents have high density, and it is well-known that a slight density reduction in high density areas produces a large effect in color material consumption reduction.

Therefore, the fourth embodiment further provides an operation effect of being able to achieve a large effect in color material reduction while restraining the reduction of legibility of high chroma colors such as black (black characters) which is most popular in text printing and red used for enhancement areas of color texts.

Next, the fifth embodiment will be described below focusing primarily on the differences from the second and fourth embodiments. Descriptions of those points having commonalities with the second and fourth embodiments will be skipped.

Figure 25:
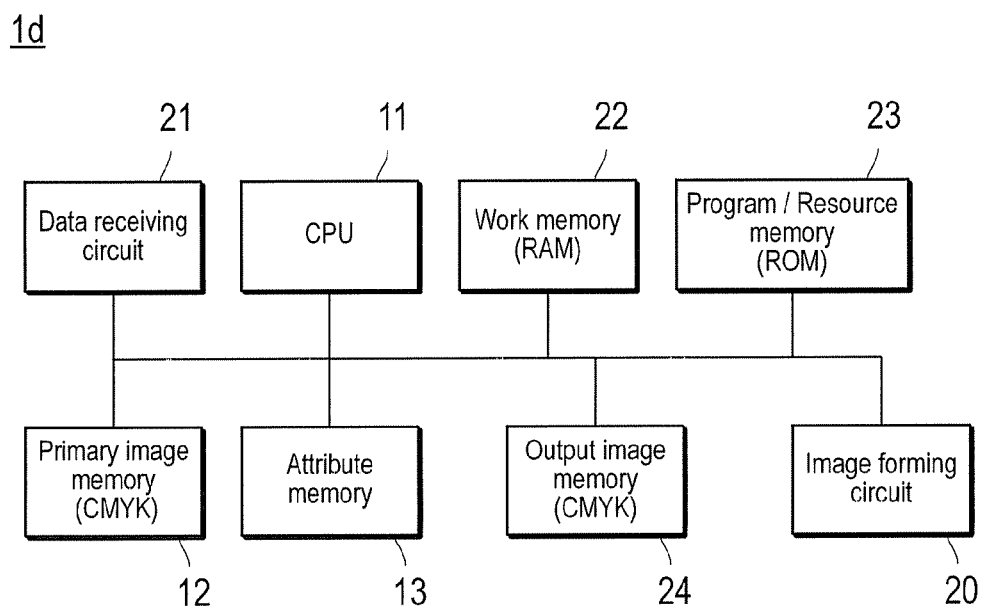
FIG. 25 is a block diagram showing the constitution of a color printing device 1d using a color printing control device according to a fifth embodiment of the present invention.

FIG. 25 is a block diagram showing the constitution of a color printing device 1d using a color printing control device according to a fifth embodiment of the present invention.

The two systems are different in that, while the function of executing the color material reduction process for reducing the consumption of the color materials is constituted in hardware in the fourth embodiment, the function of executing the color material reduction process is constituted in software in the fifth embodiment.

The color printing device 1d comprises a CPU 11 that controls various internal parts of the color printing device 1d and executes various arithmetic processes; a primary image memory 12 that stores image data obtained by the analysis of the inputted printing data; an attribute memory 13 for storing attribute data of objects to which each pixel of the image data developed in the primary image memory 12 belongs; a data receiving circuit 21 that receives printing data; a work memory (RAM) 22 that stores the program and data temporarily as the work area; a program/resource memory (ROM) 23 that stores various programs and data; an output image memory 24 that stores output image data for image formation; and an image forming circuit 20 that controls printing based on the output image data.

FIG. 25 shows those of the constituents of the color printing device 1d that are mainly related to the present invention, while the color printing device 1d may contain constituents other than those constituents described above, or may not contain a certain portion of the constituents described above.

Next, the process in the color printing device 1d will be described below referring to FIG. 26 through FIG. 30. The algorithm shown in the flowcharts of FIG. 26 through FIG. 30 is stored as a program in a storage unit such as the program/resource memory (ROM) 23 of the color printing device 1d and is executed by the CPU 11 on the work memory (RAM) 22.

Figure 26:
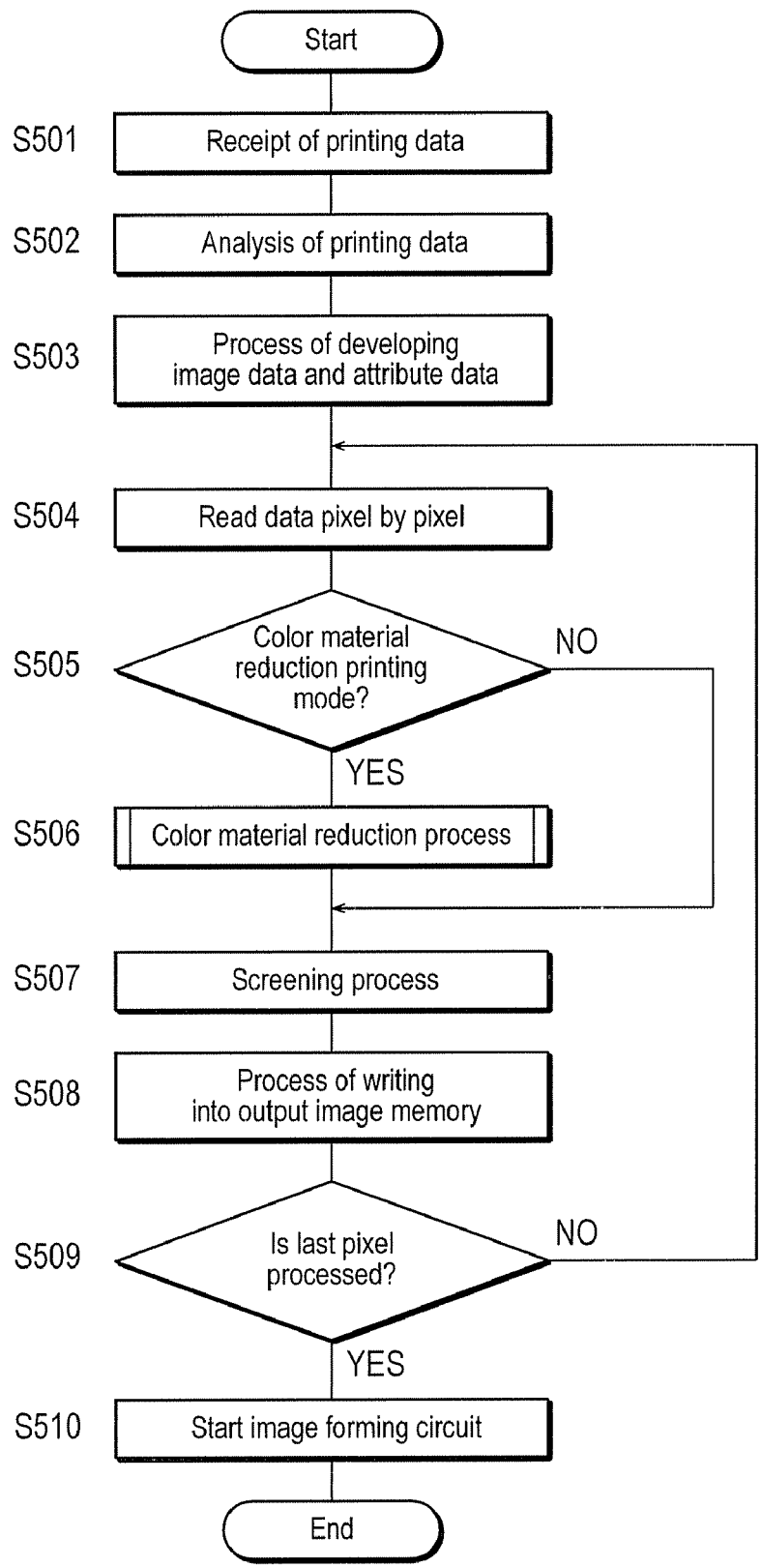
FIG. 26 is a flow chart showing the process procedure on the color printing device 1d.

Since the process of the steps S501 through S510 of FIG. 26 is the same as the process of the steps S101 through S110 of FIG. 8, the description is omitted.

If it is judged that the color material reduction printing mode is specified (S505: Yes), the color material reduction process is executed (S506).

Figure 27:
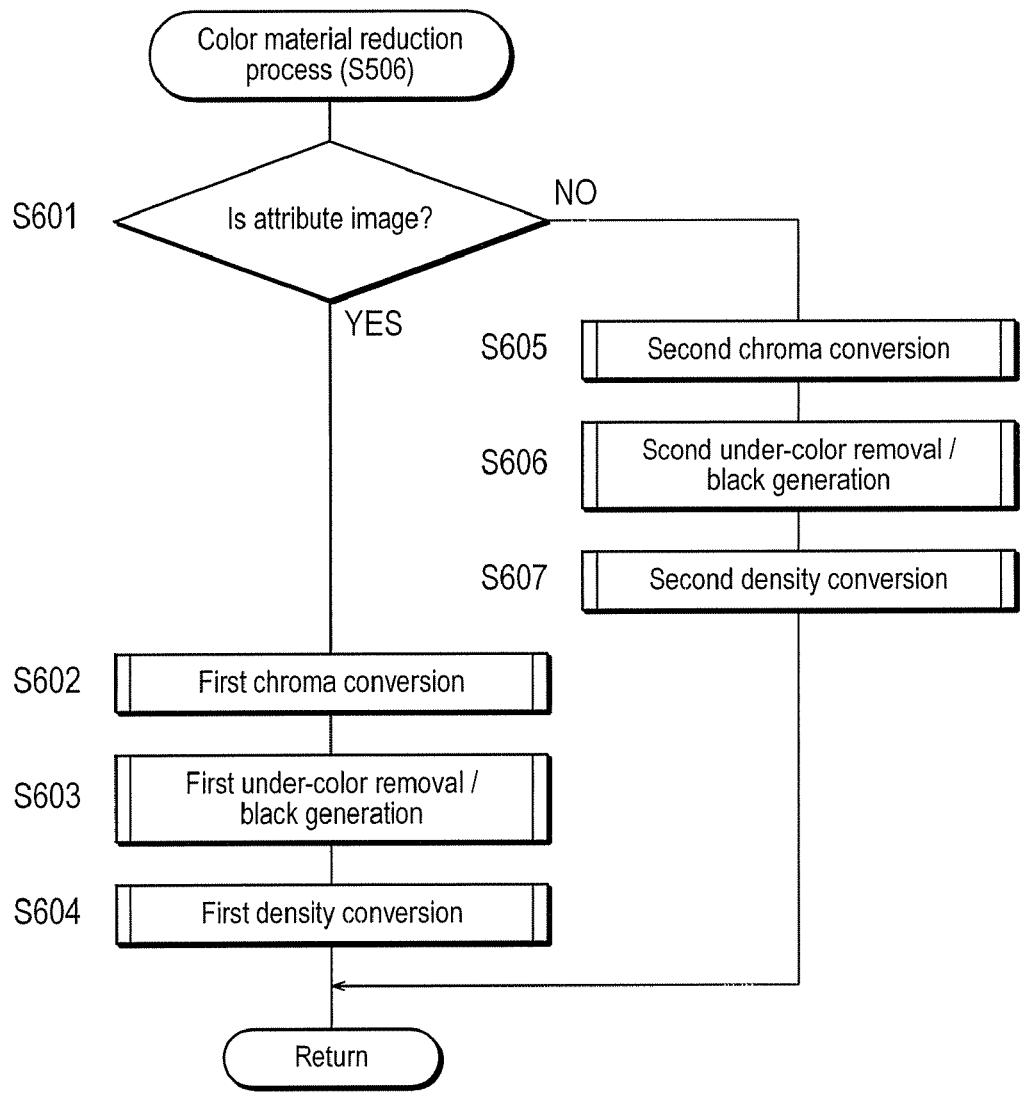
FIG. 27 is a flowchart showing the procedure of the color material reduction process.

As shown in FIG. 27, the conversion processes, i.e., chroma conversion, under-color removal/black generation; and density conversion are done sequentially in the color material reduction process (S506).

In the color material reduction process (S506), the attribute data of a pixel is first referenced, and a judgment is made as to whether the attribute of the particular pixel is an image object or not (S601).

When the attribute of the pixel is judged to be an image object (S601: Yes), the first chroma conversion (S602), the first under-color removal/black generation (S603), and the first density conversion (S604) are executed sequentially.

On the other hand, if the attribute of the pixel is judged to be that of a non-image object (S601: No), the second chroma conversion (S605), the second under-color removal/black generation (S606), and the second density conversion (S607) are executed sequentially.

Figure 28:
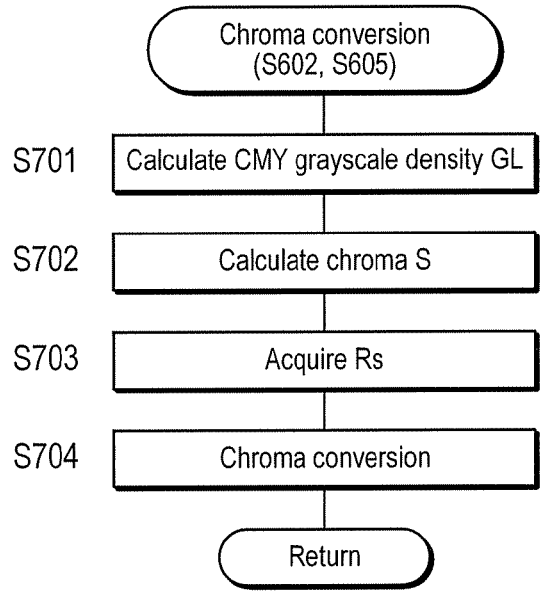
FIG. 28 is a flowchart showing a procedure of a first chroma conversion and a second chroma conversion.

FIG. 28 is a flowchart showing a procedure of a first chroma conversion (S602) and a second chroma conversion (S605).

As shown in FIG. 28, first of all, the grayscale density GL is calculated for a case when only the CMY (chromatic color) components to be inputted (S701), and then the chroma S of the input pixel is calculated (S702). Next, the chroma conversion ratio calculating data Rs corresponding to the chroma S of the input pixel is calculated (S703). Then, it conducts chroma conversion by converting the densities of the CMY (chromatic color) components referencing the grayscale density GL and the chroma conversion ratio calculation data Rs (S704).

In the present embodiment, the chroma conversion ratio table 314, which is the lookup table (LUT) for acquiring the chroma conversion ratio calculation data Rs corresponding to the chroma S of the input pixel, is stored in the program/resource memory (ROM) 23.

The algorithm for the first chroma conversion (S602) and the second chroma conversion (S605) is identical to the algorithm for the processes executed in the first chroma conversion circuit 31 and the second chroma conversion circuit 41 of the fourth embodiment (refer to FIG. 14 and FIG. 15).

Figure 29:
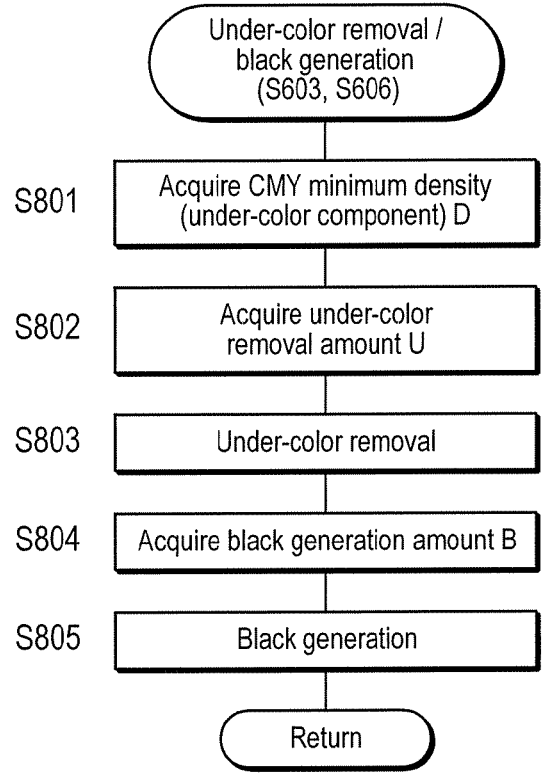
FIG. 29 is a flowchart showing a constitution of a first under-color removal/black generation and a second under-color removal/black generation.

FIG. 29 is a flowchart showing a constitution of a first under-color removal/black generation (S603) and a second under-color removal/black generation (S606).

As shown in FIG. 29, the minimum density value (under-color component) D of the inputted CMY (chromatic colors) colors is acquired first in the under-color removal/black generation (S801). Next, the under-color removal amount U corresponding to the under-color component D of the input pixel is acquired (S802). The under-color removal is then executed by reducing each density of the inputted CMY (chromatic color) components by the under-color removal amount U (S803).

Next, the black generation amount B corresponding to the under-color component D of the input pixel is acquired (S804). Then, the black generation is executed to increase the density of the inputted K (achromatic color) component by the black generation amount B (S805).

In the present embodiment, the removal amount table 323, which is the lookup table (LUT) for acquiring the under-color removal amount U corresponding to the under-color component D of the input pixel, and the generation table 326, which is the lookup table (LUT) for acquiring the black generation amount B corresponding to the under-color component D of the input pixel, are stored in the program/resource memory (ROM) 23.

The algorithm for the first under-color removal/black generation (S603) and the second under-color removal/black generation (S606) is identical to the algorithm for the processes executed in the first chroma under-color removal/black generation circuit 32 and the second under-color removal/black generation circuit 42 of the fourth embodiment (refer to FIG. 16 and FIG. 17).

Figure 30:
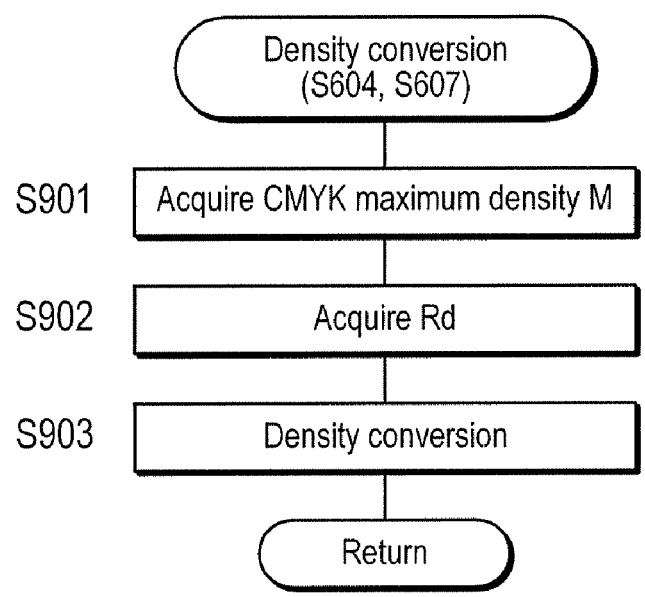
FIG. 30 is a flowchart showing a procedure of a first density conversion and a second density conversion.

FIG. 30 is a flowchart showing a procedure of the first density conversion (S604) and the second density conversion (S607).

As shown in FIG. 30, the maximum density value M is first acquired among the inputted CMYK (color material) components in the density conversion (S901). Next, the density conversion ratio calculating data Rd corresponding to the maximum density value M of the input pixel is calculated (S902). Then, the density of the CMYK (color material) components are converted based on the density conversion ratio calculating data Rd (S903).

In the present embodiment, the density conversion ratio table 333, which is the lookup table (LUT) for acquiring the density conversion ratio calculation data Rd corresponding to the maximum density value M of the input pixel, is stored in the program/resource memory (ROM) 23.

The algorithm for the first density conversion (S604) and the second density conversion (S607) is identical to the algorithm for the processes executed in the first density conversion circuit 33 and the second density conversion circuit 43 of the fourth embodiment (refer to FIG. 18 and FIG. 19).

Also, although the present embodiment is constituted in such a way as to obtain various conversion parameters by referencing the lookup tables, but the invention is not limited to it but rather can be constituted in such a way as to calculate various conversion parameters using numerical formulas.

Thus, the fifth embodiment can achieve a similar operational effect as that of the fourth embodiment.

Next, the sixth embodiment will be described below focusing primarily on the differences from the third and fifth embodiments. Descriptions of those points having commonalities with the third and fifth embodiments will be skipped.

Figure 31:
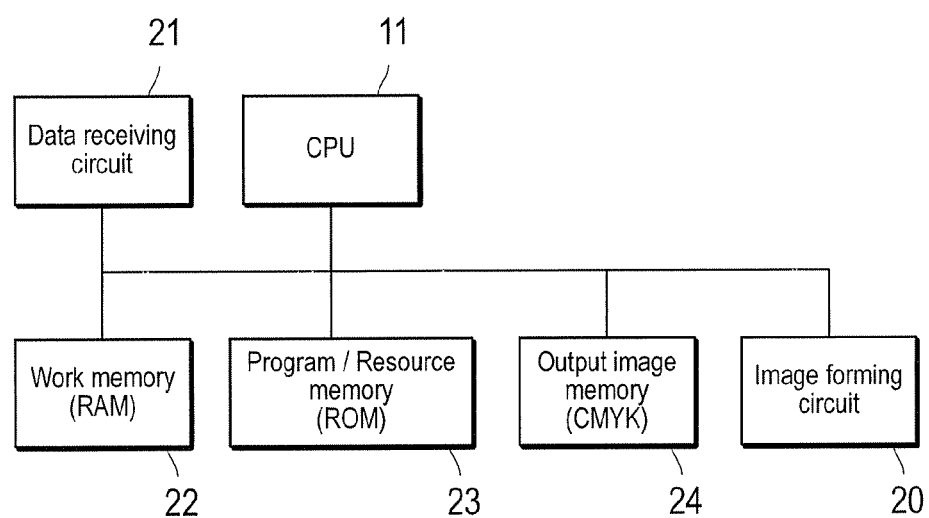
FIG. 31 is a block diagram showing the constitution of a color printing device 1e using a color printing control device according to a sixth embodiment of the present invention.

FIG. 31 is a block diagram showing the constitution of a color printing device 1e using a color printing control device according to a sixth embodiment of the present invention.

While the color material reduction process is applied to each pixel of the bitmap converted to the color material color to be used in the color printing device in the fifth embodiment, the difference of the sixth embodiment is that the color data inputted into the color printing device is converted to the color material color to be used in the color printing device using the color conversion profile for the color material reduction that allows the color material reduction process to be executed simultaneously.

The color printing device 1e comprises a CPU 11 that controls various internal parts of the color printing device 1e and executes various arithmetic processes; a data receiving circuit 21 that receives printing data; a work memory (RAM) 22 that stores the program and data temporarily as the work area; a program/resource memory (ROM) 23 that stores various programs and data; an output image memory 24 that stores output image data for image formation; and an image forming circuit 20 that controls printing based on the output image data.

FIG. 31 shows those of the constituents of the color printing device 1e that are mainly related to the present invention, while the color printing device 1e may contain constituents other than those constituents described above, or may not contain a certain portion of the constituents described above.

Next, the process in the color printing device 1e will be described below referring to FIG. 32 and FIG. 33. The algorithm shown in the flowcharts of FIG. 32 and FIG. 33 is stored as a program in a storage unit such as the program/resource memory (ROM) 23 of the color printing device 1e and is executed by the CPU 11 on the work memory (RAM) 22.

Figure 32:
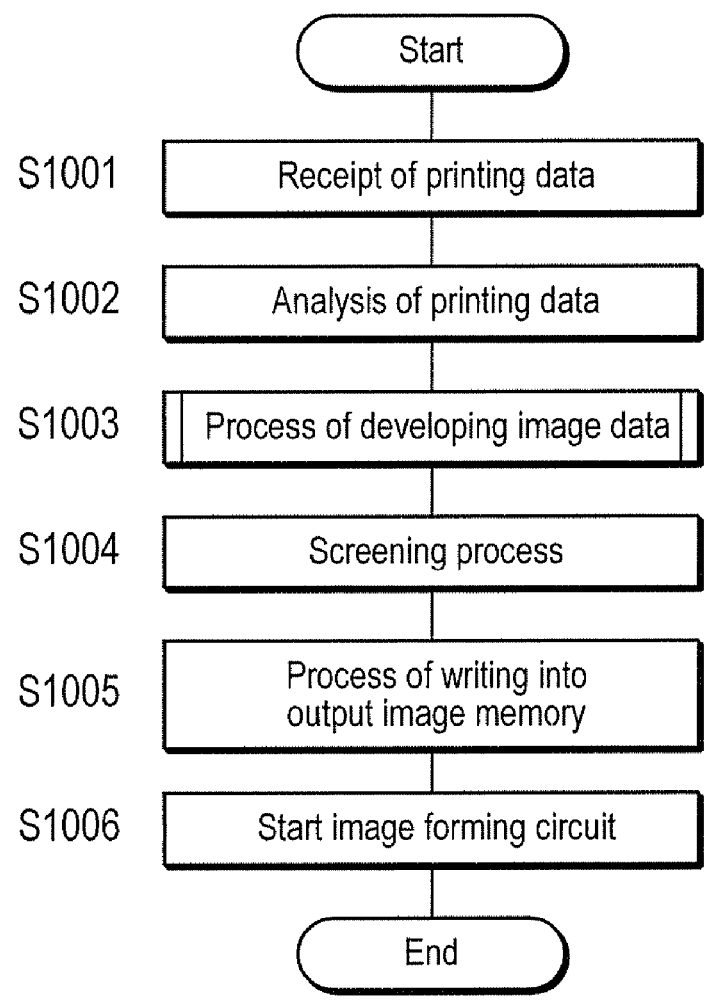
FIG. 32 is a flow chart showing the process procedure on the color printing device 1e.

Since the process of the steps S1001 through S1006 of FIG. 32 is the same as the process of the steps S301 through S306 of FIG. 11, the description is omitted.

When the colors of a printing object of the printing data received by the data receiving circuit 21 are converted into the color material colors CMYK of the color printing device 1e in the development process of the image data of step S1003, the CPU 11 conducts a color conversion process using the color profile of the color printing device 1e.

Figure 33:
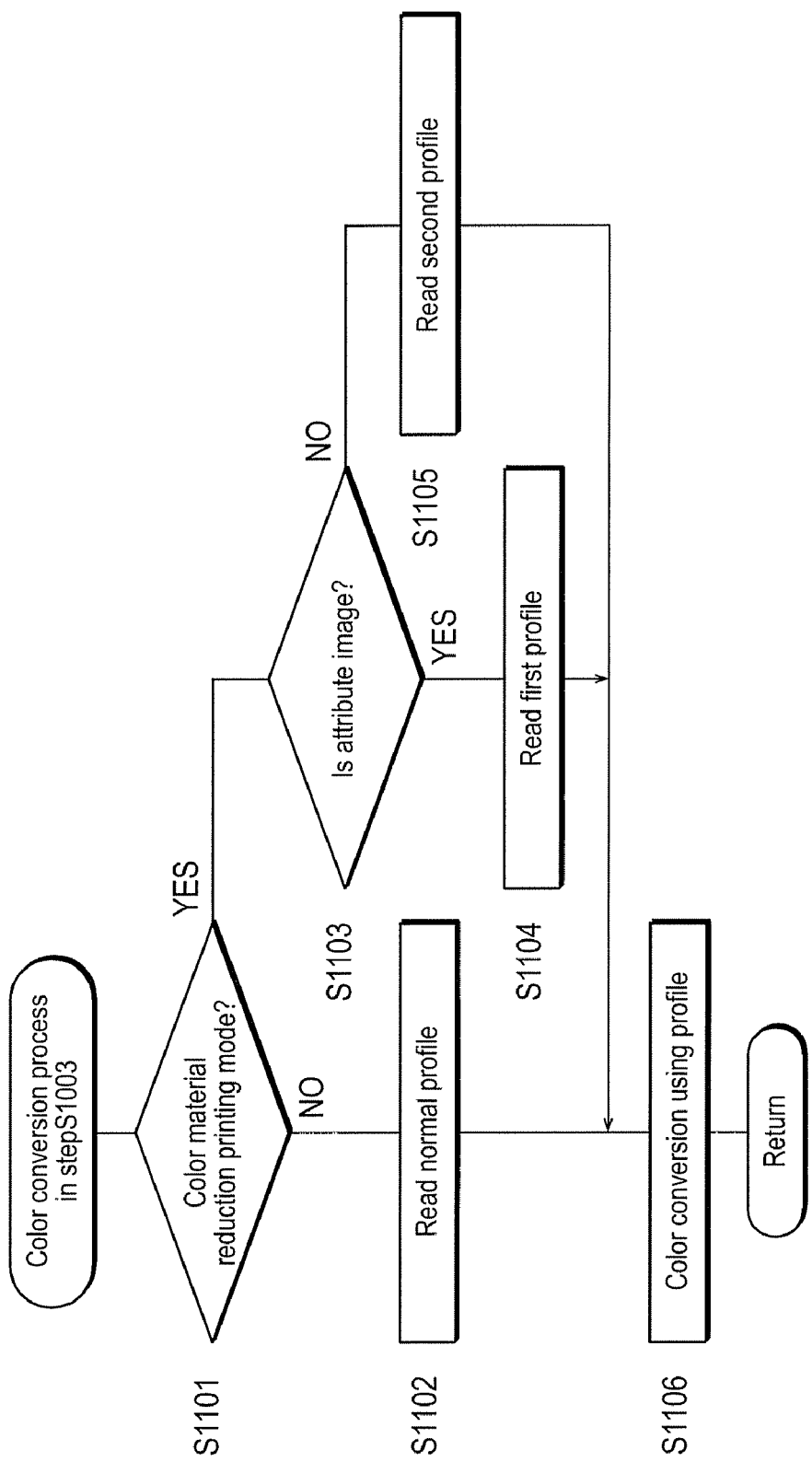
FIG. 33 is a flowchart showing the sequence of the color conversion process.

FIG. 33 is a flowchart showing the sequence of the color conversion process.

If it is judged that the color material reduction printing mode is not specified (S1101: No), the program advances to the step S1102 and the normal profile is read into the work memory 22.

On the other hand, if it is judged that the color material reduction printing mode is specified (S1101: Yes), a judgment is made as to whether the attribute is that of the image object or not (S1103). If it is judged that the attribute is that of an image object (S1103: Yes), the first profile is read into the work memory 22 (S1104); on the other hand, if it is judged that the attribute is that of a non-image object (S1103: No), the second profile is read into the work memory 22 (S1105).

The first profile in accordance with the present embodiment is a color conversion profile adjusted to be used for the image object color material reduction printing mode, and is a profile for executing the same processes as the processes to be executed in the first chroma conversion circuit 31, the first under-color removal/black generation circuit 32, and the first density conversion circuit 33 in the fourth embodiment simultaneously with color conversion. The second profile in accordance with the present embodiment is a color conversion profile adjusted to be used for the non-image object color material reduction printing mode, and is a profile for executing the same processes as the processes to be executed in the second chroma conversion circuit 41, the second under-color removal/black generation circuit 42, and the second density conversion circuit 43 in the fourth embodiment simultaneously with color conversion.

The color data entered into the color printing device 1e is color converted to the color material colors CMYK of the color printing device 1e using the profile read into the work memory 22 (S1106).

Thus, the sixth embodiment can achieve a similar operational effect as that of the fourth or fifth embodiment.

It is obvious that this invention is not limited to the particular embodiments shown and described above but may be variously changed and modified without departing from the technical concept of this invention.

For example, although the above embodiment is described as having a constitution with the color printing control device being enclosed in the color printing device, it can be constituted to have the color printing control device being separated from the color printing device.

Also, although each of the embodiments described above has a printer being used as the printing apparatus, the invention is not limited to it. The present invention is applicable to a different kind of color printing device such as MFP (Multi-Function Peripheral) and a copying machine as well.

The means and method of conducting various processes in the color printing control device according to the present invention can be realized by means of a dedicated hardware circuit, or a programmed computer. Said program can be provided either by a computer readable recording medium such as a flexible disk and a CD-ROM, or by being supplied on-line via a network such as the Internet. In this case, the program recorded on the computer readable recording medium is ordinarily transferred to and stored in a memory unit such as a hard disk. Said program can also be provided as independent application software or can be built into the software of the printing control device as a part of its function.

What is claimed is:

1. A color printing control device that controls printing of a color image by overlaying achromatic color material including at least black with a plurality of chromatic color materials on a printing medium, comprising:
   a judgment part that judges whether or not a color material reduction printing mode is specified for printing with reduced consumption of color materials; and
   an output part that outputs color material reduction processed data generated by applying a color material reduction process to each pixel of bitmaps converted to color material colors to be used in printing, when it is judged by said judgment part that the color material reduction printing mode is specified, wherein
   said color material reduction process includes chroma conversion that reduces chroma and under-color removal/black generation that replaces at least a portion of achromatic components generated by overlaying of a plurality of color materials, and
   the color material reduction process includes determining a reference value based on densities of chromatic color material components of each pixel, and the chroma conversion reduces the chroma by decreasing densities of chromatic color material components larger than the reference value, and by increasing densities of chromatic color material components smaller than the reference value.

2. The color printing control device as claimed in claim 1, wherein
   in said chroma conversion, a chroma conversion ratio, which represents a ratio of chroma after the conversion relative to chroma before the conversion, is set up for each pixel in accordance with the chroma of the pixel being processed.

3. The color printing control device as claimed in claim 2, wherein
   in said chroma conversion, the chroma conversion ratio of a first pixel is greater than the chroma conversion ratio of a second pixel, which has lower chroma than that of the first pixel.

4. The color printing control device as claimed in claim 1, wherein
   in said chroma conversion, chromatic components consisting of chromatic color components alone are converted by converting densities of chromatic color material components of each pixel.

5. The color printing control device as claimed in claim 1, wherein
   said color material reduction process further contains density conversion that reduces density.

6. The color printing control device as claimed in claim 5, wherein in said density conversion, a density conversion ratio, which represents a ratio of density after the conversion relative to density before the conversion, is set up for each pixel in accordance with the density of the pixel being processed.

7. The color printing control device as claimed in claim 6, wherein
in said density conversion, the density conversion rate of a first pixel is greater than the density conversion rate of a second pixel, which has lower density than that of the first pixel.

8. The color printing control device as claimed in claim 1, wherein
in said color material reduction process, said under color removal/black generation is performed after said chromatic conversion.

9. The color printing control device as claimed in claim 1, wherein
said color material reduction process has a first process and a second process, which is different in the process content from the first process, and
depending on the attribute of a pixel to which said color material reduction process is applied, the color material reduction process applied to the particular pixel is switched either to said first process or said second process.

10. The color printing control device as claimed in claim 9, wherein
said attribute contains the type of printing object to which the particular pixel belongs; and
the type of said printing object can be classified at least to image objects and non-image objects.

11. The color printing control device as claimed in claim 10, wherein
the parameters of processes executed in said first process and said second process are set up in such a way that the color material reduction amount for pixels of said image objects is greater than the color material reduction amount for pixels of said non-image objects.

12. The color printing control device as claimed in claim 1, wherein
the parameters of the process executed in said color material reduction process are set up based on the user's instruction at an operating unit of the color printing control device.

13. The color printing control device as claimed in claim 1, wherein
the parameters of the process executed in said color material reduction process are set up based on instructions contained in printing data inputted into the color printing control device.

14. The color printing control device as claimed in claim 1, wherein
in said under color removal/black generation, all of the achromatic components that are generated during the course of overlaying of a plurality of color materials are replaced with achromatic color material.

15. A color printing control device that controls printing of a color image by overlaying achromatic color material including at least black with a plurality of chromatic color materials on a printing medium, comprising:
a judgment part that judges whether or not a color material reduction printing mode is specified for printing with reduced consumption of color materials; and
a color conversion part that executes color conversion for converting color data inputted into the color printing control device into colors of color materials to be used in printing using color conversion profile for color material reduction acquired by simultaneously executing a color material reduction process, when it is judged by said judgment part that the color material reduction printing mode is specified; wherein
said color material reduction process includes chroma conversion that reduces chroma and under-color removal/black generation that replaces at least a portion of achromatic components generated by overlaying of a plurality of color materials, and
the color material reduction process includes determining a reference value based on densities of chromatic color material components of each pixel, and the chroma conversion reduces the chroma by decreasing densities of chromatic color material components larger than the reference value, and by increasing densities of chromatic color material components smaller than the reference value.

16. The color printing control device as claimed in claim 15, wherein
in said chroma conversion, a chroma conversion ratio, which represents a ratio of chroma after the conversion relative to chroma before the conversion, is set up for each pixel in accordance with the chroma of the pixel being processed.

17. The color printing control device as claimed in claim 16, wherein
in said chroma conversion, the chroma conversion ratio of a first pixel is greater than the chroma conversion ratio of a second pixel, which has lower chroma than that of the first pixel.

18. The color printing control device as claimed in claim 15, wherein
in said chroma conversion, chromatic components consisting of chromatic color components alone are converted by converting densities of chromatic color material components of each pixel.

19. The color printing control device as claimed in claim 15, wherein
said color material reduction process further contains density conversion that reduces density.

20. The color printing control device as claimed in claim 19, wherein
in said density conversion, a density conversion ratio, which represents the ratio of density after the conversion relative to density before the conversion, is set up for each pixel in accordance with the density of the pixel being processed.

21. The color printing control device as claimed in claim 20, where
in said density conversion, the density conversion rate of a first pixel is greater than the density conversion rate of a second pixel, which has lower density than that of the first pixel.

22. The color printing control device as claimed in claim 15, wherein
said color conversion profile for color material reduction has a first profile and a second profile, which is different in the color material reduction process content from the first profile; and
depending on the attribute of a pixel to which said color conversion is applied, the color conversion profile for color material reduction to be used in the color conversion applied to the particular pixel is switched either to said first process or said second process.

23. The color printing control device as claimed in claim 22, wherein said attribute contains the type of printing object to which the particular pixel belongs; and the type of said printing object can be classified at least to image objects and non-image objects.

24. The color printing control device as claimed in claim 23, wherein the color conversion parameters of said first profile and said second profile are set up in such a way that the color material reduction amount for pixels of said image objects is greater than the color material reduction amount for pixels of said non-image objects.

25. The color printing control device as claimed in claim 15, wherein in said under color removal/black generation, all of the achromatic components that are generated during the course of overlaying of a plurality of color materials are replaced with achromatic color material.

26. A color printing control method performed by a color printing apparatus that controls printing of a color image by overlaying achromatic color material including at least black with a plurality of chromatic color materials on a printing medium, the method comprising:

(a) judging whether or not a color material reduction printing mode is specified for printing with reduced consumption of color materials; and (b) outputting color material reduction processed data generated by applying a color material reduction process to each pixel of bitmaps converted to color material colors to be used in printing, when it is judged in the step (a) that the color material reduction printing mode is specified, wherein said color material reduction process includes chroma conversion that reduces chroma and under-color removal/black generation that replaces at least a portion of achromatic components generated by overlaying of a plurality of color materials, and wherein the color material reduction process includes determining a reference value based on densities of chromatic color material components of each pixel, and the chroma conversion reduces the chroma by decreasing densities of chromatic color material components larger than the reference value, and by increasing densities of chromatic color material components smaller than the reference value.

27. A color printing control method performed by a color printing apparatus that controls printing of a color image by overlaying achromatic color material including at least black with a plurality of chromatic color materials on a printing medium, the method comprising:

(a) judging whether or not a color material reduction printing mode is specified for printing with reduced consumption of color materials; and (b) executing color conversion for converting the inputted color data into colors of color materials to be used in printing using color conversion profile for color material reduction acquired by simultaneously executing a color material reduction process, when it is judged in the step (a) that the color material reduction printing mode is specified; wherein said color material reduction process includes chroma conversion that reduces chroma and under-color removal/black generation that replaces at least a portion of achromatic components generated by overlaying of a plurality of color materials, and the color material reduction process includes determining a reference value based on densities of chromatic color material components of each pixel, and the chroma conversion reduces the chroma by decreasing densities of chromatic color material components larger than the reference value, and by increasing densities of chromatic color material components smaller than the reference value.

28. A non-transitory computer readable recording medium stored with a color printing control program that controls printing of a color image by overlaying achromatic color material including at least black with a plurality of chromatic color materials on a printing medium, said program causing a computer to execute a process comprising:

(a) judging whether or not a color material reduction printing mode is specified for printing with reduced consumption of color materials; and (b) outputting color material reduction processed data generated by applying a color material reduction process to each pixel of bitmaps converted to color material colors to be used in printing, when it is judged in the step (a) that the color material reduction printing mode is specified, wherein said color material reduction process includes chroma conversion that reduces chroma and under-color removal/black generation that replaces at least a portion of achromatic components generated by overlaying of a plurality of color materials, and the color material reduction process includes determining a reference value based on densities of chromatic color material components of each pixel, and the chroma conversion reduces the chroma by decreasing densities of chromatic color material components larger than the reference value, and by increasing densities of chromatic color material components smaller than the reference value.

29. A non-transitory computer readable recording medium stored with a color printing control program that controls printing of a color image by overlaying achromatic color material including at least black with a plurality of chromatic color materials on a printing medium, said program causing a computer to execute a process comprising:

(a) judging whether or not a color material reduction printing mode is specified for printing with reduced consumption of color materials; and (b) executing a color conversion for converting the inputted color data into colors of color materials to be used in printing using a color conversion profile for color material reduction acquired by simultaneously executing a color material reduction process, when it is judged in the step (a) that the color material reduction printing mode is specified; wherein said color material reduction process includes chroma conversion that reduces chroma and under-color removal/black generation that replaces at least a portion of achromatic components generated by overlaying of a plurality of color materials, and the color material reduction process includes determining a reference value based on densities of chromatic color material components of each pixel, and the chroma conversion reduces the chroma by decreasing densities of chromatic color material components larger than the reference value, and by increasing densities of chromatic color material components smaller than the reference value.

\* \* \* \* \*